Feb. 11, 1941.   R. B. BLACKMAN ET AL   2,231,404
ELECTROMECHANICAL WAVE FILTER
Filed March 8, 1939        9 Sheets-Sheet 1

INVENTORS  R. B. BLACKMAN
BY         E. LAKATOS

E. V. Griggs
ATTORNEY

Feb. 11, 1941. R. B. BLACKMAN ET AL 2,231,404
ELECTROMECHANICAL WAVE FILTER
Filed March 8, 1939   9 Sheets-Sheet 2
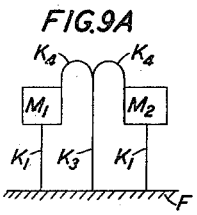
FIG.9A
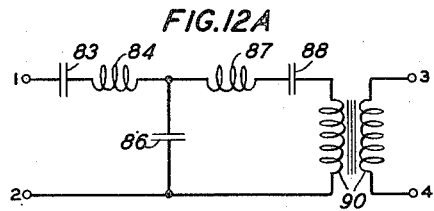
FIG.12A
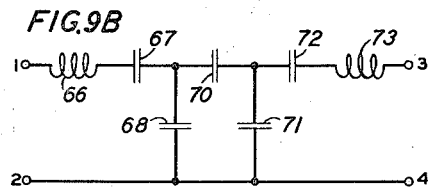
FIG.9B
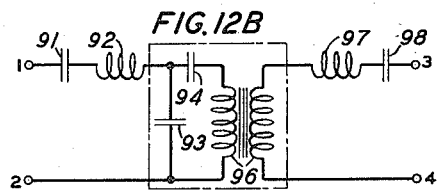
FIG.12B
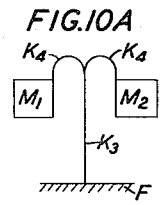
FIG.10A
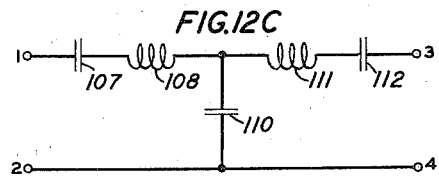
FIG.12C
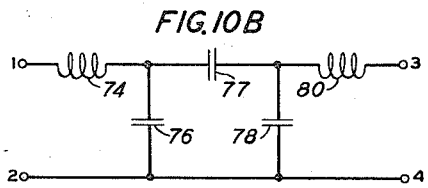
FIG.10B
FIG.13A
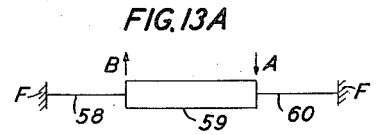
FIG.13B
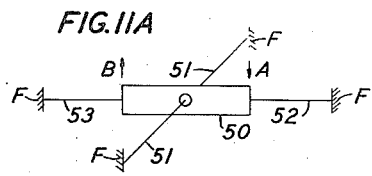
FIG.11A
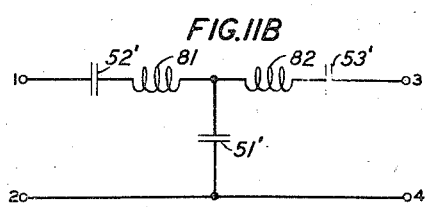
FIG.11B
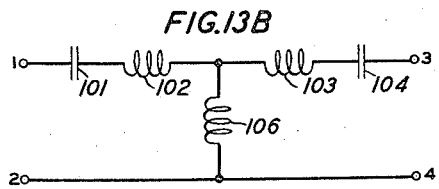
INVENTORS R.B.BLACKMAN
E.LAKATOS
BY
E.V.Griggs
ATTORNEY

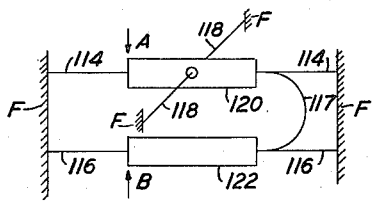
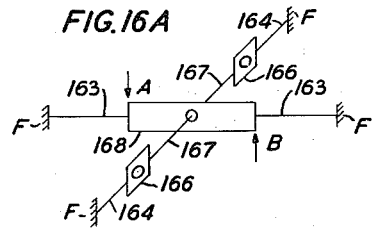
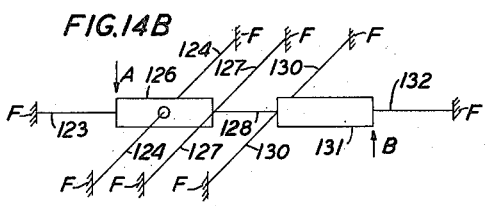
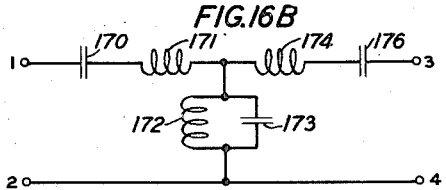
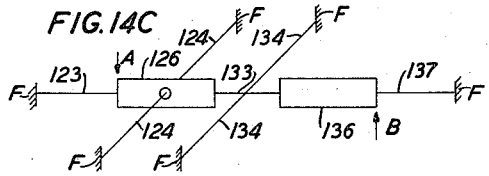
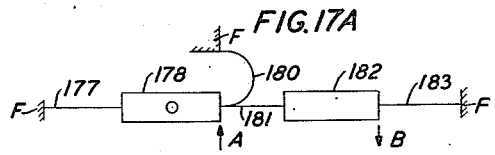
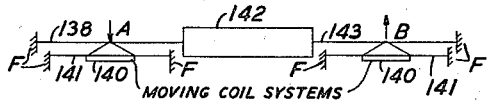
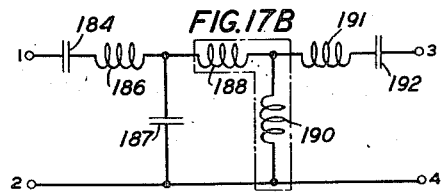
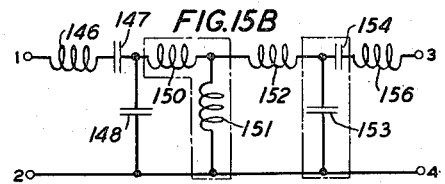
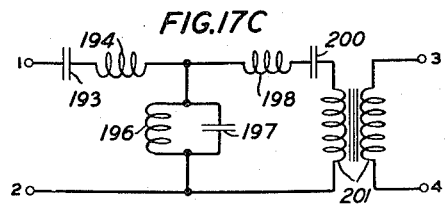
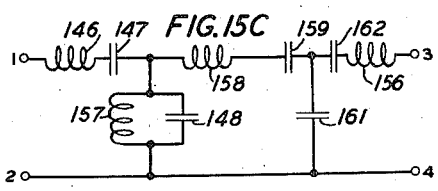

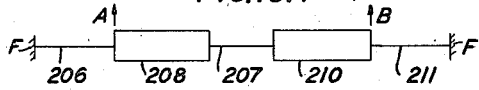
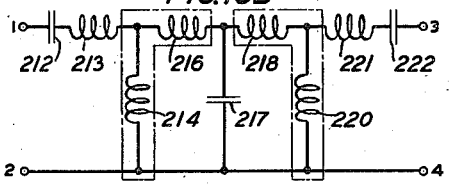
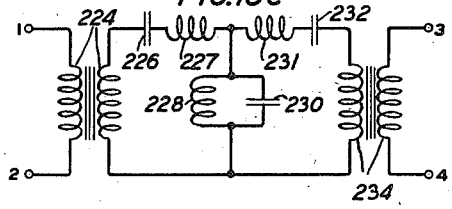
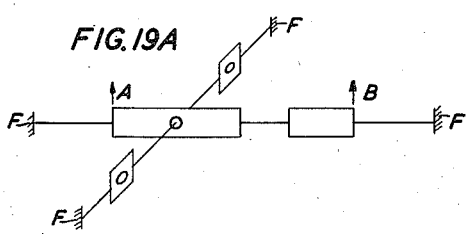
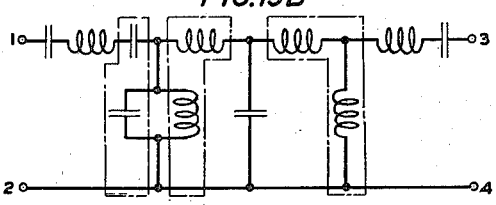
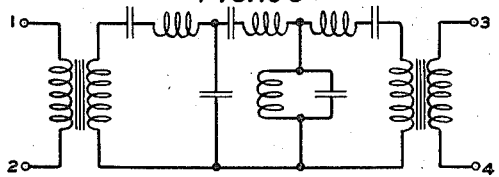
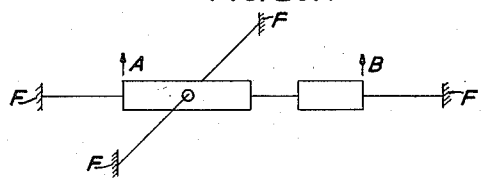
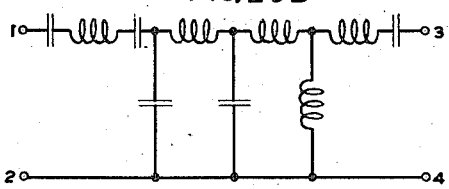
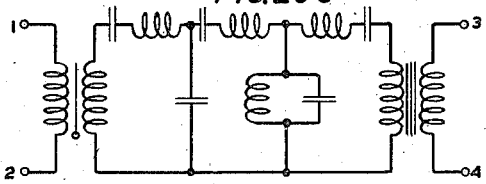
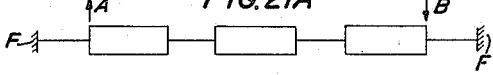
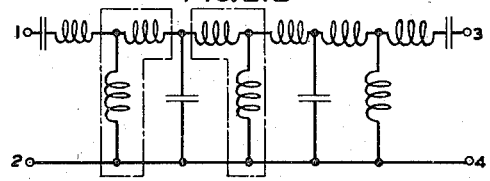
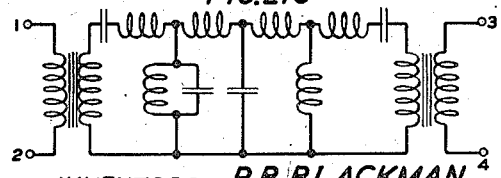

Feb. 11, 1941. R. B. BLACKMAN ET AL 2,231,404
ELECTROMECHANICAL WAVE FILTER
Filed March 8, 1939   9 Sheets-Sheet 5
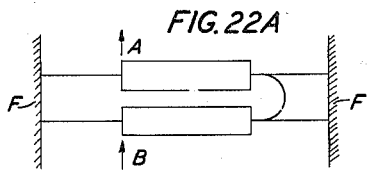
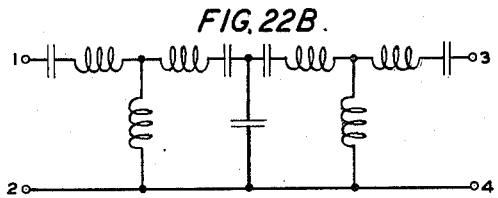
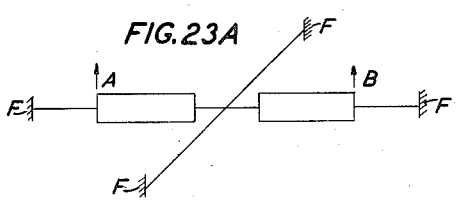
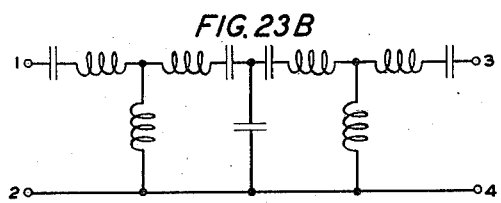
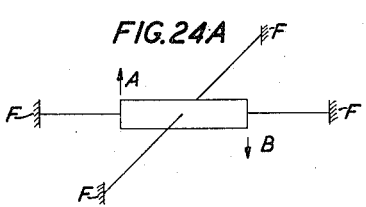
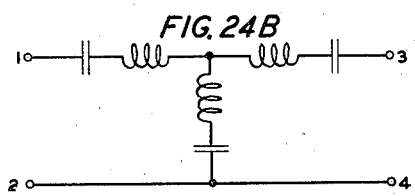
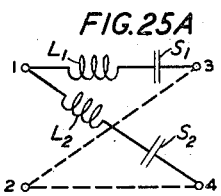
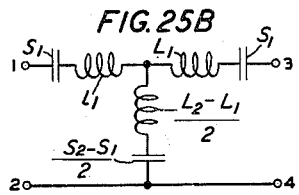
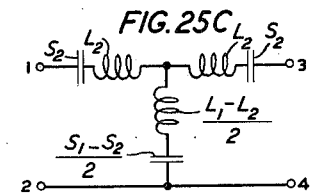
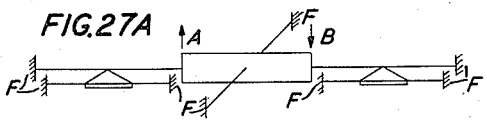
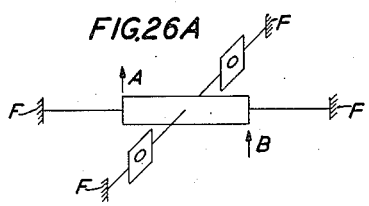
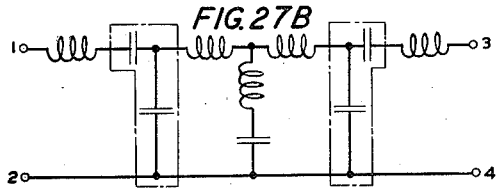
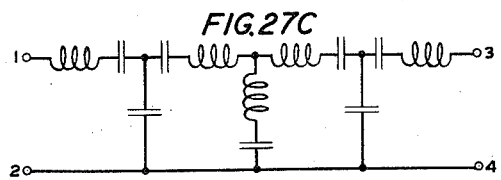
INVENTORS R.B.BLACKMAN
E.LAKATOS
BY
ATTORNEY Feb. 11, 1941.  R. B. BLACKMAN ET AL  2,231,404
ELECTROMECHANICAL WAVE FILTER
Filed March 8, 1939  9 Sheets-Sheet 6

INVENTORS R.B. BLACKMAN
E. LAKATOS
BY
E.V. Griggs
ATTORNEY

Feb. 11, 1941.  R. B. BLACKMAN ET AL  2,231,404
ELECTROMECHANICAL WAVE FILTER
Filed March 8, 1939  9 Sheets-Sheet 7

INVENTORS R.B. BLACKMAN
E. LAKATOS
BY
E. V. Griggs
ATTORNEY.

Feb. 11, 1941.  R. B. BLACKMAN ET AL  2,231,404
ELECTROMECHANICAL WAVE FILTER
Filed March 8, 1939  9 Sheets-Sheet 8

ELECTRO-DYNAMIC RECEIVING COILS

INVENTORS R.B. BLACKMAN
E. LAKATOS
BY
E.V. Griggs
ATTORNEY

Feb. 11, 1941.                R. B. BLACKMAN ET AL                2,231,404
                         ELECTROMECHANICAL WAVE FILTER
                         Filed March 8, 1939             9 Sheets-Sheet 9
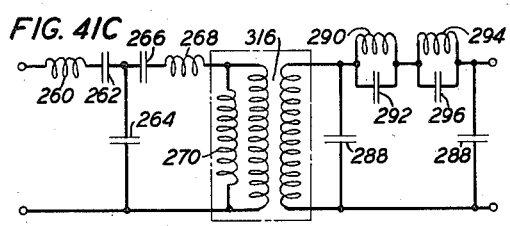
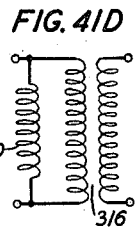
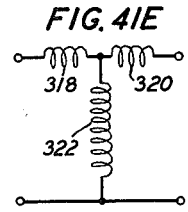
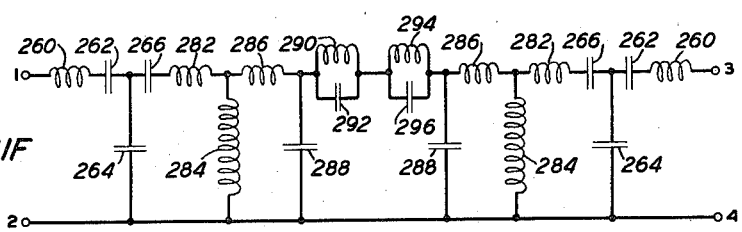
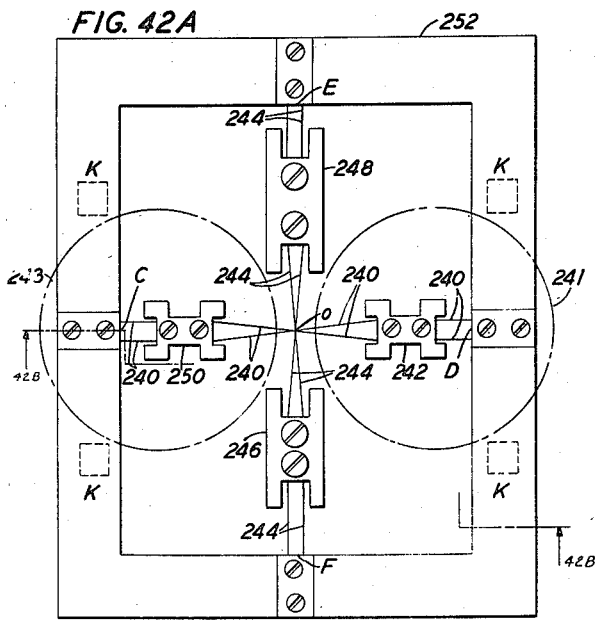
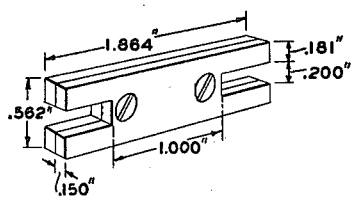
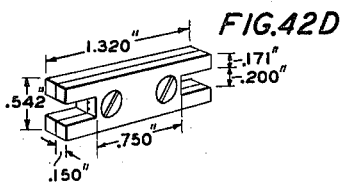
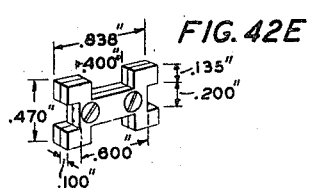
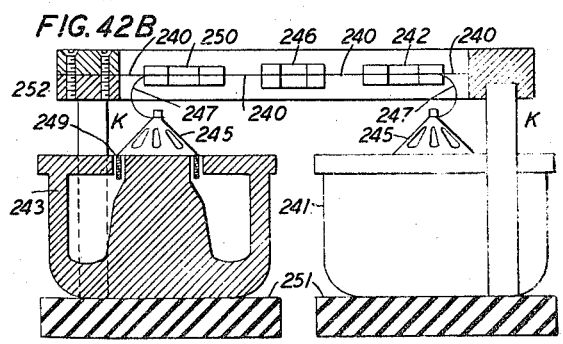
INVENTORS R. B. BLACKMAN
         E. LAKATOS
BY
E. V. Griggs
ATTORNEY Patented Feb. 11, 1941

2,231,404

UNITED STATES PATENT OFFICE 2,231,404

ELECTROMECHANICAL WAVE FILTER

Ralph B. Blackman, Cranford, N. J., and Emory Lakatos, New York, N. Y., assignors to Bell Telephone Laboratories, Incorporated, New York, N. Y., a corporation of New York Application March 8, 1939, Serial No. 260,544

27 Claims. (Cl. 178—44)

This invention relates to mechanical vibratory systems and novel methods of designing, constructing and utilizing the same. More particularly, it relates to such systems employing three-dimensional rigid masses and to novel methods of designing and constructing electromechanical and mechanical wave filters, networks and systems having transmission, phase and impedance characteristics comparable to those of a large number of conventional types of electrical wave filters and networks.

It has been realized for some time that for the subaudible and the lower audible frequencies, lumped-element type mechanical wave filters and vibratory systems offer great advantages over corresponding electrical devices especially where narrow frequency bands are involved. There have been indications also that such structures could be used to advantage throughout the lower portion of the carrier-frequency range, extending somewhat into the superaudible frequency range.

There are two principal factors which create a potential superiority of mechanical over electrical frequency selective systems in the low frequency range. The first is the purely fortuitous circumstance that for the former the necessary element values can be supplied by convenient physical sizes of masses and elastic members, while for the latter the inductances and capacitances are inconveniently large.

With regard to carrier frequency systems, while the mechanical elements tend to require inconveniently small dimensions, nevertheless this disadvantage, as compared with electrical systems, is generally more than offset by the marked economy in space that obtains through the use of mechanical systems. The second factor, which holds with greater force for the low frequency range, is that by proper design mechanical elements can be made with only a fractional part of the damping or energy dissipation that exists, even in well-designed coils. These factors indicate that it should be possible to build mechanical systems, such as filters which are extremely compact in comparison with equivalent electrical ones and which have sharper cut-offs and greater attenuation in the neighborhood of the attenuation peak frequencies.

The use of mechanical vibratory systems for wave filters and the like devices has not hitherto been as widespread as the above possibilities would appear to indicate that it might be, principally for the reason that heretofore no practicable structures have been proposed for obtaining characteristics as flexible as those obtainable by the compositing of the several well-known series of electrical structures. As a practical matter, the types of mechanical construction which have been used are with few, if any, exceptions equivalent to a sequence of simple L-type electrical sections. While it is true that more general structures have been proposed, these latter have not in general been mechanically practicable. They usually require "ideal hinges", massless levers, point masses and similar elements for the attainment of which no practical methods have heretofore been proposed.

By way of illustration of the principles of this invention, it will be shown that it is possible to obtain practical mechanical vibratory systems which possess dynamical properties corresponding to the well-known series of ladder-type electrical wave filter sections. Furthermore, examples will be given of how the mechanical structures can be combined so that their over-all characteristics shall be the equivalent of composited electrical wave filter structures.

In the mechanical vibratory systems to be described, an extensive use is made of the properties of rigid bars. Therefore, before proceeding with the description of the specific structures, the theory of rigid bars as applied in this invention will first be described and the specific structures will be then immediately derivable.

Throughout this application, including the appended claims, the term rigid when applied to a bar or mass is to be interpreted as "substantially invariable in shape and size under the application of all forces to which it will be subjected in the course of normal operation of the structure in which the bar or mass is incorporated." This interpretation is further to be taken to preclude the use of a bar or mass of such dimensions and resilience that natural resonance of the bar or mass per se should occur within or near the range of frequencies of the vibratory energy to be employed in connection with the structures of the invention, since shape and size vary under the tremendous stresses developed by resonant phenomena. Fortunately, the masses and mass distributions desirable for rigid bars employed in the structures of the invention are such that natural resonant phenomena of the bars per se occur only at frequencies far removed from the frequency range of interest, for all materials such as iron, steel, brass, etc. which are more conveniently employed in constructing such bars. The structures of this invention therefore differ substantially in character from numerous mechanical vibratory systems of the prior art in which the natural resonant phenomena of the bars or masses per se designedly contribute to the operating characteristics of the system. Accordingly, throughout the following description, whenever bars or masses are mentioned it is to be understood that they are rigid within the purview of the above description of the term.

The theory of bars is necessarily based upon certain fundamental principles of mechanics. A particularly simple relation exists when a bar or mass is supported at two points so related that each is the well-known "center of percussion" with respect to the other. When a bar is supported at two such points a lateral force applied at one of the points will produce only pure rotation about the second of the points. The body may therefore oscillate about the second point without transmitting energy to the support at that point provided only that the support will permit free rotation within the range required for the oscillatory motion. For this condition, in parlance analogous to that employed in dealing with electrical circuits, there is no "mutual mass" coupling the points together and the inertia or "inductive reactance" of the bar to lateral oscillatory motion, within the limits above designated, may be freely utilized to provide, in effect, virtually independent "point" masses at either or both points of support.

Conversely for any two points on the bar which are not mutually "centers of percussion" with respect to each other there will exist a "mutual mass" coupling the points together and the application of lateral oscillatory energy at one point will result in the transmission of like energy to the other, the transmission being dependent upon the "coupling" between the points which in turn is determined by the mass distribution throughout the bar and the location of the two points thereon.

In electrical circuit parlance, the bar is then a "transformer" having particular "input" and "output" reactances (inertias) coupled by a mutual reactance (or inertia). Since the second point of support, of any pair selected, may be chosen so as to be between the point which does bear the relation of "center of percussion" with respect to the first point, and the first point, or the second point may be chosen so as to be beyond the "center of percussion," so defined, it is obvious that the "mutual reactance" coupling the two points may be made such that the motion transmitted to the second point will be in phase, or 180 degrees out of phase, with the motion at the first point.

A permissible electrical analogue of the general bar supported at two points is therefore apparently a T-network of inductances, the series arms representing the effective inertias at the two points of support, respectively, and the shunt arm representing the "mutual" inertia coupling the two points.

In the detailed analysis given hereunder, formulae are developed by which the properties of any particular bar may be computed, numerous combinations of bars and resilient members are suggested and are shown to be capable of providing mechanical vibratory systems having properties equivalent to a large number of well-known types of electrical networks and wave filter sections.

Methods of "compositing" mechanical sections of this invention are also explained and analyzed and it will be apparent from the analysis given that the principles of the present invention permit the construction of mechanical wave filter sections and composited multisection mechanical wave filters having properties equivalent to virtually any known variety of electrical ladder-type wave filter.

Obviously, also, the principles of the invention may be applied to obtain the mechanical equivalent of practically any complex electrical network which involves reactance.

The extension of the field of practical utility for mechanical vibratory systems afforded by the principles of the present invention will be pointed out in more detail hereinunder.

A description of the general bar theory will be followed by a description of the mechanical equivalents of a well-known series of ladder-type electrical wave filter sections including a number requiring negative mutual inductance. The illustrations are of a diagrammatic nature and should not be taken as indicating that the particular type of construction suggested in any particular instance is the sole practicable one to be found. It will be shown that the majority of the well-known sections can readily be constructed as entities and further that mechanical structures of this invention may readily be made the equivalent of a composited multisection electrical structure such as a multisection electrical wave filter. Since, as will be hereinafter demonstrated, a variety of combinations of mechanical filter sections can arise from slight changes in arrangement, the technique disclosed hereinafter must be followed precisely.

For filters in which high attenuations of unwanted frequency ranges are desired, the elimination of parasitic transmission through the frame becomes of paramount importance. This problem will also be discussed and a number of applications of the general bar theory will be suggested as aids in its solution.

An object of this invention, therefore, is to facilitate the practical design of mechanical vibratory systems by the application of the general "bar" theory.

A further object is to provide practicable mechanical wave filter sections having properties closely analogous to those of numerous well-known electrical wave filter sections.

A further object is to provide a series of mechanical wave filter sections having different attenuation characteristics but similar terminal impedance characteristics so that two or more sections may be readily composited to provide complex attenuation properties without introducing deleterious energy reflection or interaction effects between adjacent sections.

A further object is to provide mechanical wave filter sections having inherent therein impedance transformations as well as prescribed attenuation characteristics.

A further object is to provide composited mechanical vibratory systems in which parasitic transmission of energy is largely eliminated.

Other and further objects will appear during the course of the following description and from the appended claims.

The features of the invention will be more apparent when considered in connection with the accompanying drawings in which.

Figure 35:
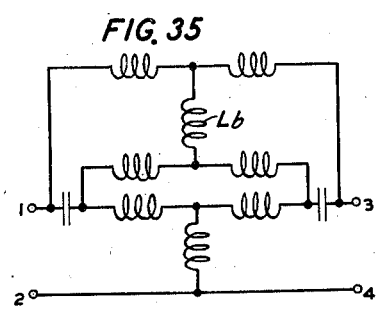
Figure 36:
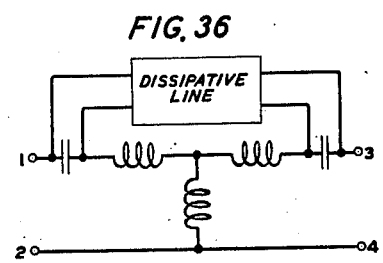
Figure 37:
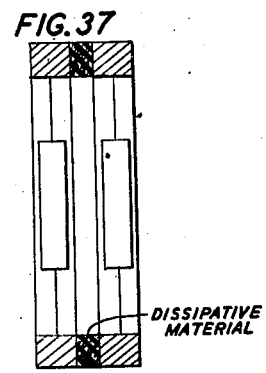
Figure 34A:
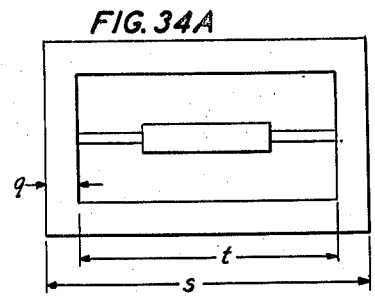
Figure 34B:
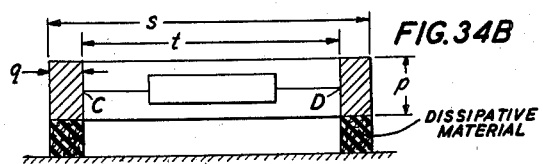

Figs. 8A to 10A, inclusive, and 8B to 10B, inclusive, represent variations of mechanical structures and their respective equivalent electrical networks, all of which are potentially equivalent;

Figs. 11A and 11B represent the mechanical and equivalent electrical structure, respectively, of a simple form of filter of this invention;

Figs. 12A to 12C, inclusive, illustrate the possibility of incorporating impedance transformation in a simple filter structure;

Figs. 13A and 13B represent the mechanical and equivalent electrical structure respectively of a second simple form of filter of this invention;

Figs. 14A to 14C, inclusive, represent more complex mechanical structures for filters of this invention;

Fig. 15A shows in diagrammatic form a filter system of this invention coupling two electromechanical transducers;

Figs. 15B and 15C show equivalent electrical structures of the system of Fig. 15A;

Figs. 16A and 16B show the mechanical and equivalent electrical structures respectively of a confluent band-pass filter of this invention;

Figs. 17A to 17C, inclusive, show the mechanical and equivalent electrical structures respectively of a confluent band-pass filter of this invention incorporating an impedance transformation;

Figs. 18A to 18C illustrate an alternate mechanical structure potentially equivalent to the combination shown in Figs. 17A to 17C, inclusive;

Figs. 19A, 19B and 19C to Figs. 21A, 21B and 21C, inclusive, Figs. 22A and 22B to Figs. 24A and 24B, inclusive, Figs. 26A and 26B, Figs. 27A, 27B and 27C, Figs. 28A and 28B, Figs. 29A and 29B, Figs. 32A, 32B and 32C and Figs. 33A, 33B, 33C and 33D show further mechanical structures illustrative of the principles of this invention and indicate possible equivalent electrical networks for the respective structures illustrated;

Figs. 25A, 25B and 25C, Figs. 30A and 30B and Figs. 31A and 31B are employed to show the equivalence for particular purposes of the networks illustrated in each group, respectively;

Figs. 34A and 34B illustrate a method of supporting a mechanical filter structure of this invention;

Figs. 35 and 36 are employed to explain the principles involved in properly designing the frame to support a mechanical filter structure of this invention;

Fig. 37 is illustrative of the unit type of construction which may be employed in connection with filters of this invention; and Figs. 38A, 38B, 39A, 39B and 40, inclusive, are illustrative of the application of the principles of this invention to a particular design of filter in which no vibratory energy is permitted to reach the supporting frame.

Figs. 41A, 41B, 41C, 41D, 41E and 41F show the equivalent electrical networks of another embodiment of the invention, the mechanical structure corresponding to these networks being shown in Figs. 42A and 42B, Figs. 42C, 42D and 42E illustrating elements used in the structure of Figs. 42A and 42B in greater detail.

Figure 1:
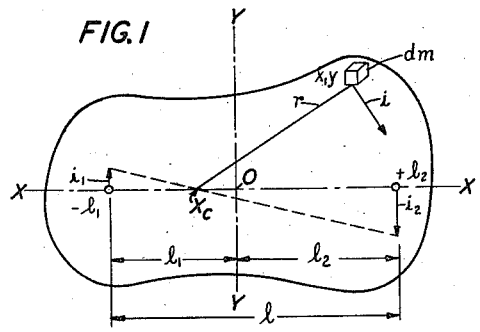
Fig. 1 represents a three-dimensional bar of general shape, the nature and utility of certain properties of which will be explained as related to the present invention.

The general bar theory underlying the filter sections of this invention may be explained as follows: Consider a solid body, as indicated in Fig. 1, of density $\rho(x, y, z)$ in oscillatory motion such that the instantaneous velocity at $x=l_1$ is $i_1$ parallel to, and positive in the sense of, the positive $y$-axis, while the instantaneous velocity at $x=l_2$ is $i_2$ parallel to, and positive in the sense of, the negative $y$-axis. It is obvious that the motion at any point on the $x$-axis will be parallel to the $y$-axis and that the motion of the whole body at any instant will be one of rotation in the X—Y plane about some point on the $x$-axis as the instantaneous center of rotation. From the known velocities $i_1$ and $i_2$, the center of rotation $x_c$ may be calculated. The equation of the line drawn from the tip of $i_1$ to that of $i_2$, shown as a dotted line in Fig. 1, is $$i = mx + b \qquad (1)$$

concerning this line we know that when $$i=0, \; x=x_c \qquad (2)$$
$$x=-l_1, \; i=+i_1 \qquad (3)$$
$$x=+l_2, \; i=-i_2 \qquad (4)$$

and $$l = l_1 + l_2 \qquad (5)$$

from which we find $$x_c = \frac{i_1}{i_1 + i_2} l - l_1 \qquad (6)$$

or $$x_c = \frac{i_1 l_2 - i_2 l_1}{i_1 + i_2} \qquad (7)$$

Next the distance $r$ from $x_c$ to a typical mass element $dM$ at $x, y$ is found by the familiar relation $$r^2 = (x - x_c)^2 + y^2 \qquad (8)$$

and the velocity $i_r$ of this mass element is determined in terms of $i_1$, $i_2$, $l_1$, $l_2$, $x$, $y$. The final step is to compute the kinetic energy and integrate over all the mass elements in the following manner:

The kinetic energy is given by:

$$dT = \frac{1}{2}dM \cdot \dot{r}^2 = \frac{1}{2}dM\left[\frac{i_2 \cdot r}{l_2 - x_c}\right]^2$$

$$= \frac{1}{2}dM \cdot \dot{i}_2^2 \cdot \frac{r^2}{(l_2-x_c)^2} = \frac{1}{2}dM\dot{i}_2^2\frac{(x-x_c)^2+y^2}{(l_2-x_c)^2} \quad (9)$$

From Equation 6

$$l_2 - x_c = l_2 - \frac{i_1 l_2 - i_2 l_1}{i_1 + i_2} = \frac{l i_2}{i_1 + i_2} \quad (10)$$

Substituting Equations 6 and 10 in Equation 9, $$dT = \frac{\frac{1}{2}dM\dot{i}_2^2\left(\left[x+l_1-\frac{i_1}{i_1+i_2}l\right]^2+y^2\right)}{\frac{l^2 i_2^2}{(i_1+i_2)^2}}$$

$$= \frac{1}{2}\frac{dM}{l^2}([(x+l_1)(i_1+i_2)-i_1 l]^2 + y^2(i_1+i_2)^2)$$

$$= \frac{1}{2}\frac{dM}{l^2}([(x+l_1-l)i_1+(x+l_1)i_2]^2 + y^2(i_1+i_2)^2)$$

$$= \frac{1}{2}\frac{dM}{l^2}([(x-l_2)i_1+(x+l_1)i_2]^2 + y^2(i_1+i_2)^2)$$

Expanding and collecting terms as coefficients of $$i_1^2,\ i_2^2 \text{ and } i_1 i_2$$

$$dT = \frac{1}{2}\frac{dM}{l^2}[(x-l_2)^2+y^2]i_1^2 +$$

$$\frac{1}{2}\frac{dM}{l^2}[2(x-l_2)(x+l_1)+2y^2]i_1 i_2 +$$

$$\frac{1}{2}\frac{dM}{l^2}[(x+l_1)^2+y^2]i_2^2 \quad (11)$$

Figure 2:
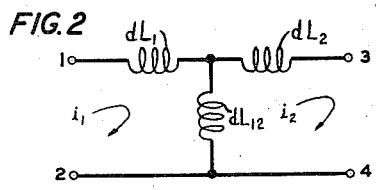
Fig. 2 represents a differential element of a general bar.

To obtain the equivalent network for a differential element, as illustrated in Fig. 2, we write the kinetic energy expression below:

$$dT = \frac{1}{2}dL_1 \cdot i_1^2 + \frac{1}{2}dL_{12}(i_1-i_2)^2 + \frac{1}{2}dL_2 i_2^2$$

Collecting terms $$dT = \frac{1}{2}(dL_1+dL_{12})i_1^2 - dL_{12} \cdot i_1 i_2 + \frac{1}{2}(dL_{12}+dL_2)i_2^2 \quad (12)$$

By direct comparison of Equation 11 and Equation 12, $$dL_1 + dL_{12} = \frac{dM}{l^2}[(x-l_2)^2+y^2] \quad (13)$$

$$dL_{12} = -\frac{dM}{l^2}[(x-l_2)(x+l_1)+y^2] \quad (14)$$

$$dL_{12} + dL_2 = \frac{dM}{l^2}[(x+l_1)^2+y^2] \quad (15)$$

Therefore, $$dL_1 = \frac{dM}{l^2}[(x-l_2)^2+(x-l_2)(x+l_1)+2y^2] \quad (16)$$

$$dL_{12} = -\frac{dM}{l^2}[(x-l_2)(x+l_1)+y^2] \quad (17)$$

$$dL_2 = \frac{dM}{l^2}[(x+l_1)^2+(x-l_2)(x+l_1)+2y^2] \quad (18)$$

If we add a mechanical impedance Z to oppose the motion of the body at point $x=0$, $y=0$, replace $dM$ by $\rho dx dy dz$ and integrate symbolically over the whole volume, the following equations are obtained, where the triple integrations are to be extended over the whole space occupied by the body.

$$L_1 = \frac{1}{l^2}\iiint[(l_2-l_1)l_2 - x(3l_2-l_1) + 2x^2 + 2y^2]\rho dx dy dz \quad (19)$$

$$L_{12} = \frac{1}{l^2}\iiint[l_1 l_2 + x(l_2-l_1) - x^2 - y^2]\rho dx dy dz \quad (20)$$

$$L_2 = \frac{1}{l^2}\iiint[l_1(l_1-l_2) + x(3l_1-l_2) + 2x^2 + 2y^2]\rho dx dy dz \quad (21)$$

As to the external impedance Z attached to the point on the body $x=0$, $y=0$, the "mechanical volt-amperes" absorbed by Z are $$F = \frac{1}{2}Z i^2\Big|_{x=0} \quad (22)$$

By proportion $$i\Big|_{x=0} = \frac{-i_2 x_c}{l_2 - x_c} = \frac{-i_2}{\frac{l i_2}{i_1+i_2}}\left[\frac{i_1 l_2 - i_2 l_1}{i_1 + i_2}\right] = \frac{l_1 i_2 - l_2 i_1}{l} \quad (23)$$

$$F = \frac{1}{2}\frac{Z}{l^2}[l_1^2 i_2^2 - 2 l_1 l_2 \cdot i_1 i_2 + l_2^2 i_1^2] \quad (24)$$

By a direct comparison, in a manner similar to that employed in connection with Equation 12, $$Z_{12} = \frac{Z l_1 l_2}{l^2} \quad (25)$$

$$Z_1 = \frac{l_2^2 - l_1 l_2}{l^2}Z \quad (26)$$

$$Z_2 = \frac{l_1^2 - l_1 l_2}{l^2}Z \quad (27)$$

Figure 3:
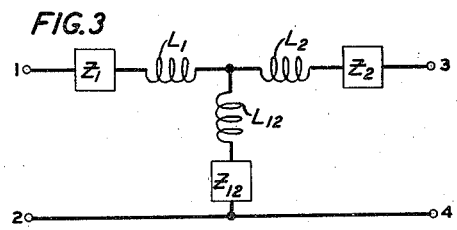
Fig. 3 represents the equivalent electrical network of the general bar of Fig. 1 with an external impedance connected thereto at the point 0, of Fig. 1.

The simplest and the most useful electrical equivalent of the system is that shown in Fig. 3. There are, of course, an infinity of electrical equivalents possessing, as four-terminal networks, the same steady-state oscillatory properties as that shown in Fig. 3. (It is not necessary that these equivalents be even theoretically stable.) For example, if the conventional positive direction for the output current $i_2$ be reversed in Fig. 3, the electrical equivalent remains schematically as in Fig. 3 but with the following changes in the formulae:

$$L_1' = \frac{1}{l}\iiint (l_2-x)\rho dx dy dz \quad (28)$$

$$L_{12}' = -\frac{1}{l^2}\iiint[l_1 l_2 + x(l_2-l_1) - x^2 - y^2]\rho dx dy dz \quad (29)$$

$$L_2' = \frac{1}{l}\iiint (l_1+x)\rho dx dy dz \quad (30)$$

$$Z_{12}' = \frac{l_1 l_2}{l^2}Z \quad (31)$$

$$Z_1' = \frac{l_2}{l}Z \quad (32)$$

$$Z_2' = \frac{l_1}{l}Z \quad (33)$$

Figure 4:
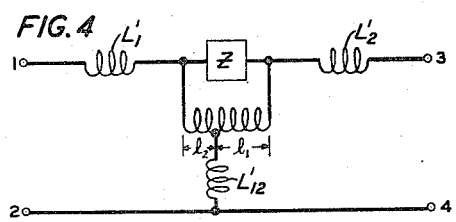
Fig. 4 is an alternate form of the network of Fig. 3.

With these differences, Fig. 3 may be shown to be equivalent to the 3-mesh network of Fig. 4. However, this and numerous other alternative equivalents do not add appreciably to the utility of the general bar in mechanical frequency-selective or distortion-corrective networks. Hence, it is expedient in the interest of simplicity to return to the original equivalent with the first set of formulae, viz., (19) to (21) and (25) to (27), inclusive.

Before these formulae are simplified for practical applications it should be noted that, $$L_1+L_2+4L_{12}=M>0 \qquad (34)$$

where $$M=\int\int\int \rho dxdydz \qquad (35)$$

where M is obviously the total mass of the body. Moreover, $$L_1+L_2=\frac{1}{l^2}\int\int\int[(l_1-l_2+2x)^2+4y^2]\rho dxdydz>0 \qquad (36)$$

As an aid in the physical interpretation of the above results the following re-expression of formulae 19 to 21 and 25 to 27, inclusive, should also be noted.

By formulae (19) to (21), inclusive, we may write $$L_1+L_2=\frac{4}{l^2}\int\int\int\left[\left(x-\frac{l_2-l_1}{2}\right)^2+y^2\right]\rho dxdydz \qquad (37)$$

$$L_1+L_{12}=\frac{1}{l^2}\int\int\int[(x-l_2)^2+y^2]\rho dxdydz \qquad (38)$$

$$L_2+L_{12}=\frac{1}{l^2}\int\int\int[(x+l_1)^2+y^2]\rho dxdydz \qquad (39)$$

$-l_1$, $l_2$ and $\frac{l_2-l_1}{2}$ are the $x$-coordinates of points 1, 2 and the midpoint between them, respectively, and we may write $$L_1+L_2=\frac{4I_{1/2}}{l^2} \qquad (40)$$

$$L_1+L_{12}=\frac{I_2}{l^2} \qquad (41)$$

$$L_2+L_{12}=\frac{I_1}{l^2} \qquad (42)$$

where $I_1$, and $I_2$ and $I_{1/2}$ are the moments of inertia about points 1, 2 and the mid-point between them respectively.

$L_1$, $L_2$ and $L_{12}$ may be expressed in terms of any three of the four parameters $I_1$, $I_2$, $I_{1/2}$ and M, by way of examples, Equations 40 to 42, inclusive, above, or Equations 43 to 45, or 46 to 48 below.

$$L_1=\frac{-I_1+4I_{1/2}+I_2}{2l^2} \qquad (43)$$

$$L_{12}=\frac{I_1-4I_{1/2}+I_2}{2l^2} \qquad (44)$$

$$L_2=\frac{I_1+4I_{1/2}-I_2}{2l^2} \qquad (45)$$

$$L_1=\frac{1}{2}\left[-M+\frac{I_1+3I_2}{l^2}\right] \qquad (46)$$

$$L_{12}=\frac{1}{2}\left[M-\frac{I_1+I_2}{l^2}\right] \qquad (47)$$

$$L_2=\frac{1}{2}\left[-M+\frac{3I_1+I_2}{l^2}\right] \qquad (48)$$

Equations 40 to 42, inclusive, however, lend themselves more readily to physical interpretation.

By analogy to the equivalent electrical circuit of Fig. 3, assuming for the moment that impedances $Z_1$, $Z_2$ and $Z_{12}$ are not present, $L_1+L_2$ is the inductance which would be measured between terminals 1 and 3 of Fig. 3. In such a measurement, the currents $i_1$ and $i_2$ are necessarily equal and the equivalent mechanical condition would be to have the body of Fig. 1 rotating about the mid-point between points $-l_1$ and $l_2$. Under this condition, the moment of inertia is $I_{1/2}$, the lever arm is $$\frac{l}{2}$$

and the effective mass is $$\frac{I_{1/2}}{\left(\frac{l}{2}\right)^2}$$

Similarly $L_1+L_{12}$ is the inductance, again assuming $Z_1$, $Z_2$ and $Z_{12}$ are not present, measured across terminals 1 and 2 of Fig. 3. In this case $i_2$ would be zero and the equivalent mechanical conditions would be to have the body of Fig. 1 rotating about the point at $l_2$. Under this condition, the moment of inertia is $I_2$, the lever arm $l$ and the effective mass is $$\frac{I_2}{l^2}$$

By the same process, a similar measurement across terminals 3 and 4 of Fig. 3 in the absence of $Z_1$, $Z_2$ and $Z_{12}$ would indicate the value of $L_2+L_{12}$; $i_1$ would be zero, the body would be rotating about the point at $-l_1$, the moment of inertia would be $I_1$, the lever arm would be $l$ and the effective mass would be $$\frac{I_1}{l^2}$$

In a similar manner when the mechanical impedance Z has been added to the system, the effective components $Z_1$, $Z_2$ and $Z_{12}$ resulting in the equivalent electrical network of Fig. 3 may be expressed as $$Z_1+Z_2=\frac{4}{l^2}\left[Z\left(\frac{l_2-l_1}{2}\right)^2\right] \qquad (49)$$

$$Z_1+Z_{12}=\frac{1}{l^2}[Zl_2^2] \qquad (50)$$

$$Z_2+Z_{12}=\frac{1}{l^2}[Zl_1^2] \qquad (51)$$

$$Z_1+Z_2+4Z_{12}=Z \qquad (52)$$

These latter formulae have a physical significance analogous to that of formulae 34 and 40 to 42, inclusive, above.

Figure 5:
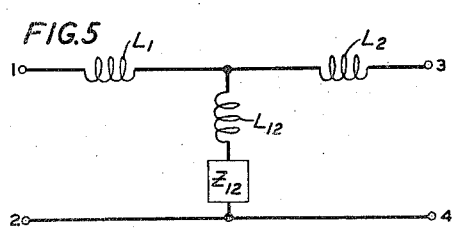
Fig. 5 illustrates a simplification of the network of Fig. 3 effected by centrally attaching the external impedance.

If the point to which Z is attached is taken half-way between the points to which $i_1$ and $i_2$ are referred $$\left(\text{that is } l_1=l_2=\frac{l}{2}\right)$$

the electrical equivalent reduces to that shown in Fig. 5 where $$L_1=\frac{1}{l^2}\int\int\int[-lx+2x^2+2y^2]\rho dxdydz \qquad (53)$$

$$L_{12}=\frac{1}{l^2}\int\int\int\left[\frac{l^2}{4}-x^2-y^2\right]\rho dxdydz \qquad (54)$$

$$L_2=\frac{1}{l^2}\int\int\int[lx+2x^2+2y^2]\rho dxdydz \qquad (55)$$

$$Z_{12}=\frac{Z}{4} \qquad (56)$$

$$Z_1=Z_2=0 \qquad (57)$$

The importance of this simplification lies in the fact that Z now no longer appears in the series arms. Thus, the choice of Z will depend only upon the desired impedance $Z_{12}$ in series with the inductance $L_{12}$ in the shunt branch. Any desired impedances in series with the inductances $L_1$ and $L_2$, respectively in the series branches, may now be supplied externally at the points $-l_1$ and $l_2$ of the body, and these added impedances will be independent of Z.

By properly shaping the body, $L_1$, $L_{12}$ and $L_2$ may, at least theoretically, be made to have any preassigned set of values consistent with Equations 34, 35 and 36. It has been found, however, that a bar of uniform density and of the shape shown in Figs. 6A to 6C, inclusive, is sufficiently general for most practical cases. The body of the bar 45 is symmetrical with respect to each of the three coordinate planes and is of length $l$. The "horns," that is, the pieces 46 and 47 added at the ends of the bar are symmetrical with respect to the X—Y and the X—Z planes, respectively, but not with respect to the Y—Z plane unless the desired values of $L_1$ and $L_2$ for the composite bar are equal.

For design purposes this bar may be considered to be a composite bar of which each of the component parts 45, 46 and 47 is a simple rectangular bar although in practice the composite bar may obviously be made in one piece. The formulae for $L_1$, $L_{12}$ and $L_2$ are applicable to each component part and the results are additive. Thus, it will be the usual, because it is the simplest, procedure to design the body of the bar 45 to give the desired value of $L_{12}$ and to supply the deficiencies in the values of $L_1$ and $L_2$ by designing the "horns" 46 and 47 so as to contribute nothing to $L_{12}$.

The following formulae, by way of illustration, give the contributions of a single rectangular component part bounded by the planes $$x = k + \frac{a}{2}, \quad X = k - \frac{a}{2}, \quad y = \frac{b}{2}, \quad y = -\frac{b}{2}, \quad z = h + \frac{c}{2}$$

and $$z = h - \frac{c}{2}$$

where $a > 0$, $b > 0$, $c > 0$ and $h$ and $k$ are perfectly arbitrary. (See Figs. 6A to 6C, inclusive.)

$$\Delta L_1 = \frac{\Delta M}{6l^2}[a^2 + b^2 - 6k(l - 2k)] \qquad (58)$$

$$\Delta L_{12} = \frac{\Delta M}{12l^2}[3l^2 - a^2 - b^2 - 12k^2] \qquad (59)$$

$$\Delta L_2 = \frac{\Delta M}{6l^2}[a^2 + b^2 + 6k(l + 2k)] \qquad (60)$$

$$\Delta M = \rho abc = \Delta L_1 + \Delta L_2 + 4\Delta L_{12} \qquad (61)$$

Thus for the body of the bar 45, for which $k = 0$, $a = l$, the preceding formulae give $$\Delta L_1 = \Delta L_2 = \frac{\Delta M}{6}\left[1 - \frac{b^2}{l^2}\right] \qquad (62)$$

$$\Delta L_{12} = \frac{\Delta M}{6}\left[1 - \frac{b^2}{2l^2}\right] \qquad (63)$$

It should be noted that even in the case of this component of the composite bar, by making $b = \sqrt{2}l$ it is possible to make $\Delta L_{12} = 0$. These dimensions are, however, obviously impractical and do not provide for any difference in the desired values of $\Delta L_1$ and $\Delta L_2$.

In the case of the "horns" 46 and 47 for which $k \neq 0$, $a \neq l$, there is considerably more latitude in attaining the desired $\Delta L_{12} = 0$. It is necessary only to choose $k$, $a$, $b$ and $c$ so as to satisfy the following equations.

$$k = \frac{l}{2} \frac{\Delta L_2 - \Delta L_1}{\Delta M} \qquad (64)$$

$$a^2 + b^2 = 12l^2 \left(\frac{\Delta L_1}{\Delta M}\right)\left(\frac{\Delta L_2}{\Delta M}\right) \qquad (65)$$

$$\rho abc = \Delta M = \Delta L_1 + \Delta L_2 \qquad (66)$$

Since there are only three of these equations to be satisfied by the four design parameters there is obviously a single infinity of simultaneous values of these parameters. Moreover, further latitude is furnished by the fact that the deficiencies in the values of $L_1$ and $L_2$ of the composite bar may be supplied by the two pairs of "horns" 46 and 47 one at each end of the composite bar, in any proportions that might prove convenient. (When $\Delta L_1 < \Delta L_2$ and $$k + \frac{a}{2} < \frac{l}{2}$$

or when $\Delta L_1 > \Delta L_2$ and $$k - \frac{a}{2} > -\frac{l}{2}$$

the appendages 46 and 47 lose the character of "horns"). If, for example, the deficiencies are 10 in $L_1$ and 7 in $L_2$, these could be supplied by a single pair of "horns" for which $$k = -\frac{3l}{34}, \quad a^2 + b^2 = \frac{840}{289}l^2, \quad \rho abc = 17$$

Or, two pairs could be used for one of which $\Delta L_1$ is anything less than 10 and $\Delta L_2$ is anything less than 7, and the deficiencies are supplied by the other pair. The two pairs of "horns" 46 and 47 might or might not overlap. If no convenient dimensions can be found for which they do not overlap, they can as a practical matter be overlapped in the direction of the z-axis without invalidating the theory. Usually a few judicious trials will suffice to arrive at satisfactory dimensions for component parts of the composite bar.

The foregoing procedure whereby the "horns" are designed to contribute nothing to the $L_{12}$ of the composite bar affords a practicable, and usually also a practical, method of effectively adding "point masses," that is, masses which may be considered to be concentrated at a single point, at the ends of a simple bar.

In some applications it may be necessary, in order to obtain more suitable or convenient dimensions for the composite bar, to design the body of the bar 45 to furnish more or less than the desired value of $L_{12}$ and to design the "horns" 46 and 47 so as to compensate for the excess or deficiency in $L_{12}$ as well as the deficiencies in $L_1$ and $L_2$. In such cases the formulae to be satisfied by $k$, $a$, $b$ and $c$ are the following:

$$k = \frac{l}{2}\frac{\Delta L_2 - \Delta L_1}{\Delta M} \qquad (67)$$

$$a^2 + b^2 = 12l^2\left[\left(\frac{\Delta L_1}{\Delta M}\right)\left(\frac{\Delta L_2}{\Delta M}\right) + \left(\frac{\Delta L_{12}}{\Delta M}\right) - 4\left(\frac{\Delta L_{12}}{\Delta M}\right)^2\right] \qquad (68)$$

$$\rho abc = \Delta M = \Delta L_1 + \Delta L_2 + 4\Delta L_{12} \qquad (69)$$

Figure 6A:
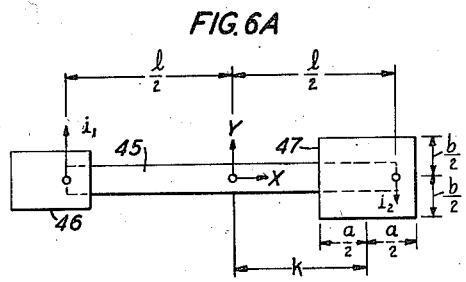
Figs. 6A, 6B and 6C, show the side, top and end views respectively of a general rectangular bar of convenient shape for use in the devices of this invention.
Figure 6B:
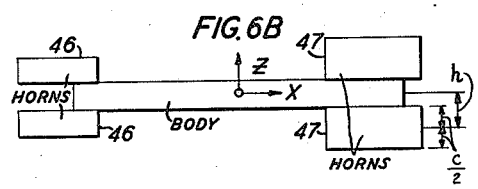
Figure 6C:
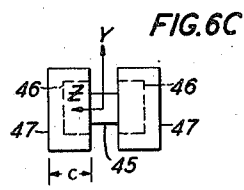

An important extension of the idea underlying the procedure outlined in the above paragraph is to design the "horns" 46 and 47 so that the composite bar shall have zero or negative values of $L_{12}$ when the equivalence and formulae appertaining to Fig. 5 are used, in which case the "horns" will obviously have to extend beyond the ends of the body of the bar if the type of construction shown in Figs. 6A to 6C, inclusive, is used. Zero values of $L_{12}$ will be necessary, of course, when the desired shunt-branch impedance has a root instead of a pole at zero reciprocal frequency (i. e. at infinite frequency). The possibility of obtaining negative values of $L_{12}$ opens up a field of filter characteristics to mechanical filters which is accessible to ladder-type electrical wave filters only through the use of electrical transformers to furnish the negative mutual inductances required.

Figure 7:
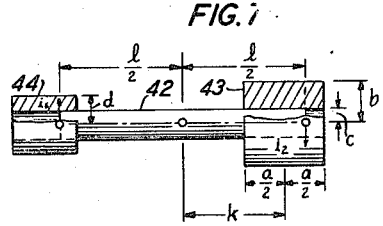
Fig. 7 shows the details of a general cylindrical bar of convenient construction for use in the devices of this invention.

In practice, it often happens that a composite bar possessing cylindrical symmetry, as shown in Fig. 7, is desirable. In such a bar the "horns" become cylinders such as 43 and 44 concentric with the body of the bar 42. Consider a typical component bounded by two concentric cylinders 42 and 43 of Fig. 7 having radii $b$ and $c$, respectively, where $b>c$, with the $x$-axis as their common axis and by the two planes $$x=k+\frac{a}{2} \text{ and } x=k-\frac{a}{2}.$$

(see Fig. 7.)

Corresponding to the formulae (58) to (61), inclusive, the following formulae now hold:

$$\Delta L_1 = \frac{\Delta M}{6l^2}[a^2+3(b^2-c^2)-6k(l-2k)] \quad (70)$$

$$\Delta L_{12} = \frac{\Delta M}{12l^2}[3l^2-a^2-3(b^2-c^2)-12k^2] \quad (71)$$

$$\Delta L_2 = \frac{\Delta M}{6l^2}[a^2+3(b^2-c^2)+6k(l+2k)] \quad (72)$$

$$\Delta M = \pi \rho a(b^2-c^2) = \Delta L_1 + \Delta L_2 + 4\Delta L_{12} \quad (73)$$

Thus for a uniform cylindrical bar, $k=0$, $c=0$, $a=l$, whence $$\Delta L_1 = \Delta L_2 = \frac{\Delta M}{6}\left(1+\frac{3b^2}{l^2}\right) \quad (74)$$

$$\Delta L_{12} = \frac{\Delta M}{6}\left(1-\frac{3b^2}{2l^2}\right) \quad (75)$$

By making $b=0.816l$, $\Delta L_{12}$ vanishes.

Corresponding to formulae (67) to (69), inclusive, the following will be found useful in connection with the bar of Fig. 7:

$$k=\frac{l}{2}\frac{\Delta L_2-\Delta L_1}{\Delta M} \quad (76)$$

$$a^2+3(b^2-c^2)=$$
$$12l^2\left[\left(\frac{\Delta L_1}{\Delta M}\right)\left(\frac{\Delta L_2}{\Delta M}\right)+\left(\frac{\Delta L_{12}}{\Delta M}\right)-4\left(\frac{\Delta L_{12}}{\Delta M}\right)^2\right] \quad (77)$$

$$\pi \rho a(b^2-c^2) = \Delta M = \Delta L_1 + \Delta L_2 + 4\Delta L_{12} \quad (78)$$

In the following paragraphs illustrative examples will be given of the practical application of the general bar theory to the attainment of mechanical structures which possess dynamical properties corresponding to each of a list of well-known ladder-type electrical filter sections. The sections selected for this purpose are mainly those listed on pages 315 to 318 of the book "Transmission Networks and Wave Filters" by T. E. Shea published in 1929 by D. Van Nostrand Co. Inc., 250 Fourth Avenue, New York city, and also some of the types described in an article entitled "Mutual Inductance in Wave Filters, with an Introduction on Filter Design" by K. S. Johnson and T. E. Shea in the Bell System Technical Journal, Vol. IV, No. 1 of January 1925, containing effectively negative inductances. The designations employed in the first-mentioned book by Shea for the various filter sections being discussed will, in general, be used in the following description.

The examples to be given hereunder by no means exhaust the number of mechanical structures of the present invention which possess dynamical properties corresponding to each of the electrical sections listed either individually or in combinations as components of a composite structure. Neither do they by any means constitute a complete list of the electrical networks whose dynamical characteristics may be simulated by mechanical combinations embodying the principles of this invention.

An attempt to exhaust the practical applications of the present invention to the design of mechanical vibratory systems having useful properties would be extremely tedious and will not be made in this application. A large number of structures will, however, be described in an effort to adequately illustrate the extremely broad scope of the principles underlying the invention.

The structures here described have been chosen with a view to bringing out some of the more important contingencies which are encountered in the design of several novel types of mechanical structures suitable for use in composited mechanical filters. Limitations which may be possessed by particular structures here described are not indicative of inherent limitations in structures of the invention.

It should be borne in mind that in the case of mechanical filters of this invention, as in that of electrical filters, there is a wide choice of structures capable of giving any particular set of transmission, phase and impedance characteristics, provided there is any. It is for this reason that it is expedient to distinguish between "electrical analogs" and "electrical equivalents".

Figures 8A, 8B:
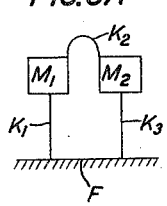
Figure 28A:
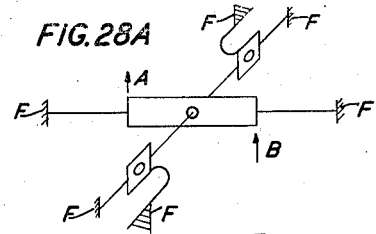
Figure 28B:
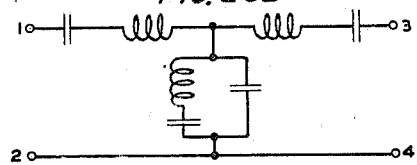

The distinction will be apparent from the following illustration. Under ideal conditions the electrical analog of the conventional mechanical filter of Fig. 8A is shown in Fig. 8B, that of Fig. 9A is shown in Fig. 9B, and that of Fig. 10A is shown in Fig. 10B. But the electrical networks of Figs. 8B, 9B and 10B are potentially equivalent since by substitution of equivalent T and $\pi$ condenser combinations (see page 91 of Shea's book, supra) they may all be readily reduced to the form shown in Fig. 8B. Hence, Fig. 8B may be regarded as the electrical equivalent of the mechanical structures of Figs. 9A and 10A as well as the electrical analog of the structure of Fig. 8A. Bearing this in mind, it is clear that the general bar has no electrical analog; but it has an infinite number of electrical equivalents, of which two are shown in Figs. 3 and 4, respectively.

Any hypothetical electrical network possessing the same transmission characteristics as a mechanical structure employing bars cannot, therefore, be any more than an electrical equivalent. This being so, any particular electrical equivalent may be transformed into any other equivalent electrical network which latter may have a greater or smaller number of meshes and which may or may not contain ideal transformers. By such artifices, a particular mechanical system may be shown to have particular filter characteristics, either per se or in conjunction with other mechanical structures, and the mechanical system may be shown to possess in some instances internal impedance transformations.

In the case of electrical filters, the choice of structure is determined principally by the cost of the elements. While ordinarily the structures requiring the minimum number of elements are least expensive, situations are sometimes encountered in which the choice of a structure containing more elements results in a saving in cost. In the case of mechanical filters the cost of the parts is usually small and the choice of structure is, therefore, usually almost entirely dictated by considerations of mechanical construction, facility of adjustment and likelihood of accidental maladjustment. Also, some types of construction are capable of yielding higher effective efficiencies than others.

In the diagrammatic representations of mechanical structures in the accompanying drawings, stiffness or elastance members, that is, either reeds, leaf springs or taut wires, are represented by simple lines. Usually where taut wires are employed, two conveniently spaced parallel or converging wires may be used to advantage to facilitate the mounting of the bars thereon and to constrain the mechanical system from vibration in undesired directions. Composite bars of the type shown in Figs. 6A to 6C, inclusive, or that shown in Fig. 7, are represented by simple rectangles and fixed parts, such as points of attachment to a fixed supporting frame, are represented by hatchings designated F. Auxiliary tensed elastance members, which may also carry bars, are provided in numerous instances and are placed in a common plane with the elastances and bars of the main system but with their longitudinal axes in approximate quadrature relation with those of the main system. Leaf springs of approximately semicircular form are usually employed to couple electromechanical transducers to appropriate points of the mechanical system for imparting or withdrawing energy therefrom. In a few instances such springs are also employed to provide additional elastances as parts of the mechanical system per se. In general, leaf springs are mounted in the plane of the vibratory motion rather than in a plane at right angles thereto as in the case of tensed wire elastances.

To facilitate visualization of the mechanical combinations employed in the systems of this invention, many of the representations will be shown in quasi-perspective diagrammatic form. A bar designed to have zero mutual mass is distinguished from others by a small circle at the center of the rectangle. Small arrows designated A and B are employed, in the absence of other indicative structure, to show the appropriate points at which energy should be introduced into or drawn from the mechanical vibratory system in order that its characteristics with respect to mechanical energy transmission should be comparable to the electrical characteristics of the equivalent electrical network indicated.

Although the familiar type of mechanical filter construction illustrated in Figs. 8A to 10A, inclusive, the sections illustrated having the potentially equivalent electrical structure designated $III_1$ by Shea, supra, is practicable in some instances when this type of section may be used exclusively, it is difficult, and at times impossible, to join other types of sections with it in a composited structure. Furthermore, the masses, such as $M_1$ and $M_2$, of such structures cannot physically be made either actual or equivalent point masses and each mass element provides only one reactive component to the formation of the mechanical vibratory structure. Bearing these facts in mind, it is apparent that the structure of Fig. 11A, embodying the principles of the present invention, lends itself more readily and far more advantageously to use in composited mechanical filter structures. The structure of Fig. 11A has the added advantage of being more rugged mechanically and less subject to the hazard of being thrown out of adjustment.

In Fig. 11A, tensed wires 52 and 53 are mechanically equivalent to the series condensers 52' and 53' of the electrical network of Fig. 11B. Bar 50 of Fig. 11A, having zero mutual mass, provides only point masses, one at each point of support, equivalent to inductances 81 and 82 of Fig. 11B. The auxiliary tensed wire 51 of Fig. 11A provides the only mutual or shunt impedance of the system and is the equivalent of condenser 51' of Fig. 11B. Auxiliary wire 51, as mentioned above, is placed in the same plane as wires 52 and 53 but with its longitudinal axis at a sufficient angle (usually 90 degrees) to avoid interference with other parts of the system.

It should be noted that the type of construction shown in Fig. 11A may be designed to provide impedance transformation. This becomes evident if we start with the network Fig. 12A, transform it into the network Fig. 12B and, making use of the equivalence shown in Fig. 67, page 136 of the above-mentioned book by Shea, further transform it into the network of Fig. 12C, which is identical in form to that of Fig 11B.

In the practical design of a similar electrical section with impedance transformation, the transformation ratio is limited by the fact that the impedance transformation ratio "$\phi$" must be positive in order that the shunt stiffness or capacity shall be positive and further by the fact that negative values of the stiffness in the right-hand series branch must be numerically less than the positive stiffness in the left-hand series branch of the adjacent section on the right-hand side.

This limitation obviously holds in the case of the mechanical section of Fig. 8A and also in that of Fig. 11A, if the cross-wire in the latter is midway between the ends of the bar. However, this median location of the impedance to motion of an internal point of the bar was introduced, as mentioned above, merely in order to simplify the formulae. By going back to the more general conditions under which the original formulae 19 to 21, inclusive, and 25 to 27, inclusive, prevail, the limitation imposed by the sign of the stiffness in the series branch is, to a large extent nullified. It is then possible to effectively obtain negative stiffnesses in one of the series branches.

A mechanical equivalent of the section designated $III_2$ by Shea, supra, is provided by the structure of Fig. 13A, as is obvious from its electrically equivalent structure shown in Fig. 13B, the bar 59 of Fig. 13A providing the mechanical equivalent of the T-network of inductances 102, 103 and 106 of Fig. 13B and the elastance members 58 and 60 providing the mechanical equivalents of the condensers 101 and 104, respectively.

As in the case of the structure of Fig. 11A the structure of Fig. 13A may be designed so as to provide impedance transformation. This may readily be seen by interchanging capacity for inductance and vice versa in the network shown in Figs. 12A to 12C, inclusive.

While it may superficially appear that the transformation ratio is limited by the impossibility of obtaining negative inductance in the series branches, actually there is no limitation since the ratio $\phi$ may in this instance be negative. Thus, it is not necessary with this type of section to relinquish the simplification obtained in Fig. 5.

While the constant-K confluent type of section, designated $IV_k$ by Shea, supra, is equivalent to the combination of a $III_1$ type and a $III_2$ type section designed to the same image-impedance and connected in tandem, it is not practical to join the structures shown in Figs. 11A and 13A since this would require an "ideal hinge," that is a hinge having no friction and no clearance. However, if these structures are joined through a mutual stiffness as may be done in a number of ways, two examples being shown in Figs. 14A and 14B, respectively, the combination is easily shown to be potentially equivalent to two $III_2$ and one $III_1$ type, or to one constant-K confluent and one $III_2$ type section, with or without impedance transformation. The structure of Fig. 14C illustrates a third method which gives the same result.

The above paragraph illustrates a difficulty which not infrequently arises, when it is desired to join two mechanical structures which are satisfactory when used separately. The result may in some instances be somewhat unsatisfactory from a practical standpoint but can often be remedied by slight modifications which may introduce additional sections into the electrical equivalent. These additional sections may fortuitously fill a desired purpose which would otherwise have to be met by coupling still another mechanical structure to the system, as for example, a second structure like Fig. 11A, if the first and the $III_1$ type section were joined by an "ideal hinge." On the other hand, of course, the additional sections may, for reasons such as delay or distortion, produce in some cases an undesirable composited structure.

Assuming that the additional $III_2$ type section is tolerable or desirable, there are simpler mechanical structures than those of Figs. 14A to 14C, inclusive, which will give the same result. An obvious one is that of Figs. 15A to 15C which may contain impedance transformation. This type of construction is virtually a combination of the structure of Fig. 13A with two structures similar in nature to that of Fig. 8A.

It may here be noted that Fig. 15A represents in diagrammatic form a complete electromechanical wave filter. The electromechanical wave filter of Fig. 15A comprises transducers of the well-known moving coil type, one being employed as an input device to convert electrical into mechanical energy and apply it to the mechanical vibratory system and the other serving as an output device to convert the mechanical energy received by it from the mechanical vibratory system into electrical energy. The moving coils 140 of these transducers are carried on diaphragms 141 clamped at the edges in fixed supports F. Capacities 147 and 154 of Fig. 15B are the electrical equivalents of the diaphragms 141 of the input and output transducers, respectively, and inductances 146 and 156 are similarly the electrical equivalents of the masses of the respective moving coils and associated parts of the input and output transducers. Shunt capacities 148 and 153 of Fig. 15B are the electrical equivalents of elastance members 138 and 143, respectively, of Fig. 15A and the T-network of inductances 150, 151 and 152 of Fig. 15B is the electrical equivalent of the bar 142 of Fig. 15A.

The equivalent network of Fig. 15C may now be readily derived from Fig. 15B by reversing the inductance L-network formed by coils 150 and 151 of Fig. 15B and the capacity L-network formed by condenser 153 and effectively a portion of condenser 154 of Fig. 15B. That is, condenser 154 may be replaced by two condensers in series, one of which will be associated with the L-network to be reversed and the other of which will provide the desired capacity 162 of Fig. 15C. The principles underlying the reversal of L-network, as above suggested, are explained in Shea's book, supra, at pages 135 and 136. An impedance transformation is introduced in each instance and the two may compensate wholly or partly for each other or they may be additive so that the impedance at terminals 3, 4 of the network of Fig. 15C may be equal to or larger or smaller than that at terminals 1, 2 of the network.

As a matter of design practice, the electrical network of the form of Fig. 15C, which would provide the desired attenuation characteristics and terminal impedances, may, if convenient, first be determined. From it an equivalent network of the form of Fig. 15B may then be derived and the mechanical system of Fig. 15A may then be designed to be the mechanical equivalent of the network so derived.

A mechanical structure which provides a constant-K confluent section more directly than the combination of a $III_1$ type and a $III_2$ type section worked in tandem, is that shown diagrammatically in Fig. 16A. An equivalent electrical network of the structure of Fig. 16A is shown in Fig. 16B, condensers 170 and 176 of Fig. 16B being the equivalent of elastance members 163 of Fig. 16A, inductances 171 and 174 of Fig. 16B being the electrical equivalent of bar 168 of Fig. 16A and inductance 172 and capacity 173 of Fig. 16B being the electrical equivalents of bars 166 and elastance members 167 of Fig. 16A, respectively.

It should be noted that all three bars of Fig. 16A are shown diagrammatically (by the small central circle) as having no mutual masses. Because of this, bar 168 contributes no shunt inductance and bars 166 isolate elastance members 164 and the points on the supporting frame to which they are connected from the vibratory energy of the system and provide effectively point masses.

Elastance members 167 must, of course, as explained above, be connected at the mid-point of bar 168 so that the impedance provided by the combination of elastance members 167 and bars 166 will appear solely in the shunt arm of the equivalent electrical networks.

Energy is introduced into the mechanical vibratory system at one end of bar 168 and taken from it at the other end of this same bar. Elastance members 163 are, of course, active components of the vibratory system and hence vibratory energy may through them reach their respective points of support on the supporting frame of the system. Measures to be taken to avoid possible deleterious effects, such as parasitic transmission of energy through the frame or the dissipation of energy in the frame will be discussed at length in connection with other structures illustrative of the principles of this invention which will be discussed hereunder. It should be noted that no impedance transformation is incorporated into the structure of Fig. 16A.

Two mechanical structures embodying the principles of this invention which provide a constant-K confluent section having impedance transformation are diagrammatically shown in Figs. 17A and 18A.

In the structure of Fig. 17A, bar 178 is designed to have no mutual mass so that elastance member 177 is isolated from the vibratory energy of the system. Bar 178 and elastance member 180 of Fig. 17A are represented in the equivalent electrical network of Fig. 17B by inductance 186 and capacity 184, respectively. Elastance members 181 and 183 of Fig. 17A are represented by capacities 187 and 192 of Fig. 17B, respectively, and bar 182 of Fig. 17A is represented by the T-network of inductances 188, 190 and 191 of Fig. 17B. The network of Fig. 17B may then be shown to be equivalent to that of Fig. 17C by inverting the L-network of inductances 188 and 190 in accordance with principles, above explained, whence it becomes apparent that the structure of Fig. 17A may be designed to provide a mechanical structure having as an equivalent electrical network a constant-K confluent section and an impedance transformation.

Similarly, the structure of Fig. 18A comprising elastance members 206, 207 and 211 and bars 208 and 210 may obviously be designed to have an equivalent electrical network of the type shown in Fig. 18B which may in turn obviously be equivalent to a network of the form shown in Fig. 18C providing for impedance transformation at each end of the network.

The elimination of one of the shunt stiffness elements in Fig. 15A, that is, coupling one of the transducers directly to the near end of bar 142, also leads to a constant-K confluent section. The resulting structure then becomes essentially a tandem combination of a III$_2$ type section of Fig. 8A and a III$_1$ type section of Fig. 13A. However, it is not advisable to use a structure which requires the rigid attachment of the armature or moving coil of an electromechanical transducer, hereinafter referred to as a receiver, to a bar since the oscillatory motion of the bar may be impeded by the armature or moving coil, and the armature or moving coil will experience a twisting motion about the instantaneous axis of rotation of the bar.

Additional structures which provide the equivalent of two III$_2$ type and one III$_1$ type sections in tandem, or one constant-K confluent and one III$_2$ type section in tandem are derivable from the structures of Figs. 16A to 18A, inclusive, by the obvious expedient of interposing a mutual stiffness between either the input or the output point and the corresponding receiver, advantage being taken of the inherent mass and stiffness of the receiver armature or coil and diaphragm for the final series branch. Other expedients, corresponding one to each of the structures of Figs. 16A to 18A, are shown in the structures of Figs. 19A to 23A, inclusive. The equivalent electrical networks are obviously those of Figs. 19B, 19C, 20B, 20C, 21B, 21C, 22B and 23B, respectively.

The principles and processes involved in demonstrating the relations between the several forms of equivalent electrical networks for the mechanical structures disclosed in these figures, and the further illustrative figures which will be described hereunder, should now be obvious from the several detailed discussions given above, such as those relating to Figs. 15A, 15B, 15C, 16A, 16B, etc. As it is felt that no difficulty will be encountered by those conversant with the art in perceiving the equivalences in the remaining figures, the description thereof has been simplified by the omission of the detailed identification of each mechanical element with each electrical element and the detailed description of transformations, above described, and well known to be applicable in deriving one electrical network from another in the several manners indicated.

Structures which provide the equivalent of one III$_2$ type and two III$_1$ type sections in tandem, or one constant-K confluent section and one III$_1$ type section in tandem are derivable from the structures of Figs. 14A and 18A as illustrated by the structures of Figs. 22A and 23A. It should be apparent from the above discussion that a number of other unique mechanical structures of this invention may also be readily derived which will give the same results.

The "$m$-derived" sections, designated IV$_1$ and IV$_2$ by Shea, supra, are obviously provided by structures similar to those of Figs. 11A and 13A. A particular example is shown in Fig. 24A, one equivalent electrical network being shown in Fig. 24B. The structure of Fig. 24A obviously may possess internal impedance transformation. As in the case of electrical ladder sections which make use of transformers, these $m$-derived structures are not restricted to positive values of $m$ within the range from 0 to 1 only, but may have any positive value of $m$ within much wider practical limits. This comes about from the fact that the mutual mass of the bar may be negative when the mutual stiffness is positive, or vice versa, depending upon the choice of conventional positive directions in the meshes of the electrical equivalent.

The practical limits on the value of $m$ are dependent only upon the practical limits on the coefficient of coupling of the bar in the case of $m$-derived III$_2$ type sections, and on the cut-offs as well in the case of $m$-derived III$_1$ type sections. In order to show the form of these relationships it is necessary to observe, first that the lattice network of Fig. 25A is equivalent to the T-networks of Figs. 25B and 25C if phase shifts of 180 degrees, independent of frequency, are disregarded. In the case of $m$-derived III$_2$ type sections, $$L_1 = \frac{mR}{\omega_2 - \omega_1} \qquad (79)$$

$$L_2 = \frac{R}{m(\omega_2 - \omega_1)} \qquad (80)$$

$$S_1 = \frac{m\omega_1^2 R}{\omega_2 - \omega_1} \qquad (81)$$

$$S_2 = \frac{\omega_2^2 R}{m(\omega_2 - \omega_1)} \qquad (82)$$

whence $$S_1 - S_2 = \frac{\omega_1^2 R}{m(\omega_2 - \omega_1)} \left[ m^2 - \left(\frac{\omega_2}{\omega_1}\right)^2 \right] \qquad (83)$$

It is obvious then that if $m<1$ (the peak of attenuation occurs between the upper cut-off and infinite frequency) the T-network of Fig. 25B should be used in design work. If $m>f_2/f_1$ (the peak of attenuation occurs between the lower cut-off and zero frequency) the T-network of Fig. 25C should be used. If $1<m<f_2/f_1$ (the peak of attenuation occurs at no real frequency, zero and infinity included) and the T-network of Fig. 25B should be used.

Denoting the coefficient of coupling in Fig. 25B by $k_B$, $$k_B = \frac{L_2 - L_1}{L_2 + L_1} \frac{1 - m^2}{1 + m^2} \quad (84)$$

whence $$m = \sqrt{\frac{1 - k_B}{1 + k_B}} \quad (85)$$

while if $k_C$ be the coefficient of coupling in Fig. 25C $$k_C = \frac{L_1 - L_2}{L_1 + L_2} \frac{m^2 - 1}{m^2 + 1} \quad (86)$$

whence $$m = \sqrt{\frac{1 + k_C}{1 - k_C}} \quad (87)$$

The limitations upon the value of $m$ imposed by practical considerations concerning the rigidity of the bar may be illustrated by the following example. Suppose that the coupling coefficient should be confined to the limits $-0.6$ and $+0.8$. In the case of Fig. 25B, $m$ will be confined to the limits $1/3$ and $2$, while in the case of Fig. 25C, $m$ will be confined to the limits $1/2$ and $3$. The minimum value of $f_\infty/f_2$, when the peak is above the upper cut-off, is then determined by $$\left(\frac{f_\infty}{f_2}\right)\text{min.} = \sqrt{\frac{9 - \left(\frac{f_1}{f_2}\right)^2}{8}} \quad (88)$$

$$f_\infty > f_2$$

In accordance with a common convention in the art of wave filter design $f_1$, $f_2$ and $f_\infty$ are employed to represent the lower and upper cut-off frequencies of the transmitted band of frequencies and the "peak" frequency, or frequency of infinite attenuation, respectively, for the particular filter section under consideration. Since the minimum value of $f_1/f_2$ is 0, it is practical in any case to make $f_\infty/f_2$ as small as 1.06. The maximum value of $f_\infty/f_1$ when the peak is below the lower cut-off is determined by $$\left(\frac{f_\infty}{f_1}\right)\text{max.} = \sqrt{\frac{9 - \left(\frac{f_2}{f_1}\right)^2}{8}} \quad (89)$$

$$f_\infty < f_1$$

Thus if $f_2 > 3f_1$ it is not practical to place the peak anywhere below the lower cut-off, while if $f_\infty/f_1 = 0.94$ is to be practical $f_2$ must be less than $1.39f_1$.

In the preceding paragraph it was stated parenthetically that when the value of $m$ for an $m$-derived $III_2$ type section was greater than $f_2/f_1$, the peak of attenuation occurs between the lower cut-off and zero frequency. This follows from the essential equivalence of the $m$-derived $III_1$ and $III_2$ type sections. Except for a constant phase shift of 180 degrees, independent of frequency, the values of $m$ in equivalent $m$-derived $III_1$ and $III_2$ type sections are related by the equation $$m_1 = \frac{1}{m_2} \frac{f_2}{f_1} \quad (90)$$

where $m_1$ and $m_2$ relate to $III_1$ and $III_2$ type sections, respectively. Thus, when $m_2 > f_2/f_1, m_1 < 1$; when $m_2 < 1$, $m_1 > f_2/f_1$; and when $1 < m_2 < f_2/f_1$, $1 < m_1 < f_2/f_1$. The foregoing paragraphs, therefore, really dispose of the $m$-derived $III_1$ type section with $m < 1$ as a special case of the $m$-derived $III_2$ type section with $m > f_2/f_1$. If the same analysis is carried out on the $m$-derived $III_1$ type section, the physical limitations upon the location of the peaks of attenuation must of necessity turn out the same.

It may also be noted that for the $m$-derived $III_1$ or $III_2$ type section where $1 < m < f_2/f_1$, the peak of attenuation occurs, mathematically speaking, on the imaginary axis of the frequency plane. At real frequencies the attenuation remains finite even for zero and infinite frequencies.

With respect to the five-element sections, designated $V_1$ and $V_2$ by Shea, supra, the $V_1$ section is equivalent to a $III_1$ type section and an $m$-derived $III_2$ type section. Hence, if an additional $III_2$ type section is desired, or if it may be tolerated, a structure of the type of Fig. 13A may be joined to one of the type of Fig. 24A through a mutual stiffness. If the additional section introduced by this type of coupling is not desirable the structure illustrated in Fig. 26A may be used.

The structure of Fig. 27A, which is an obvious modification of that of Fig. 15A, provides a $V_2$ section and an additional $III_2$ type section. If the additional section is not desirable, the structure of Fig. 28A may be used.

The six-element dissymmetrical and six-element symmetrical sections designated $VI_1$ by Shea, supra, are equivalent to a tandem combination of a $IV_1$ and a $IV_2$ section. However, two mechanical structures of the type shown in Fig. 24A cannot be coupled practicably except through a mutual stiffness which adds a $III_2$ type section to the composited filter characteristic. If the additional section is desired this is an excellent way of securing it. If undesirable, other mechanical structures must be sought.

Figure 29A:
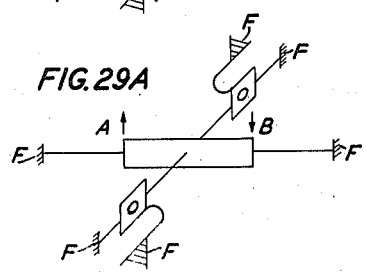
Figure 29B:
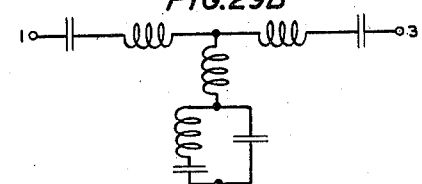

A type of mechanical structure which provides a six-element (in general, dissymmetrical) section directly is that shown in Fig. 29A. It bears a structural similarity to the $IV_k$ structure of Fig. 16A. Design formulae directly applicable to the electrical equivalent shown in Fig. 29B will be found in Fig. 148, page 269 together with formulae (108) page 267, (112) page 269 and (125) and (126) page 275 of Shea's book, mentioned above.

The above descriptions have been confined to the mid-series type sections, that is, sections which have the same mid-series image-impedance as a constant-K or $IV_k$ type section. Since the principles involved are quite similar only a brief presentation of the mid-shunt type sections will be given.

Figure 30A:
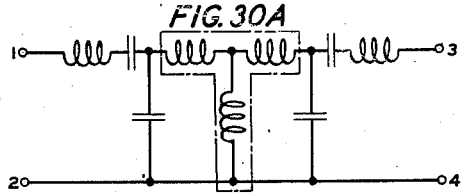
Figure 30B:
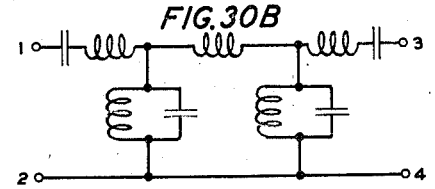
Figure 31A:
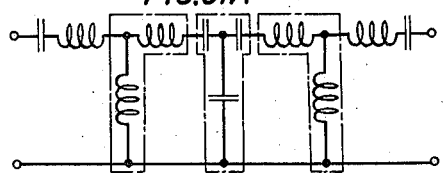
Figure 31B:
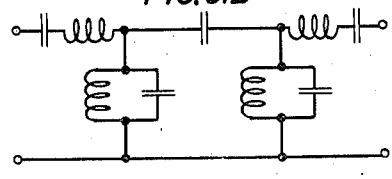

Taking the electrical network of Fig. 15B and carrying it through the transformations indicated in Figs. 30A and 30B, it is apparent that the mechanical structure of Fig. 15A is potentially equivalent to a half $IV_k$ section with the mid-series end towards one receiver, a full mid-shunt $III_3$ section, and another half $IV_k$ section with the mid-series end towards the other receiver. Similarly, taking the electrical network of Fig. 23B and carrying it through the transformations indicated in Figs. 31A and 31B it is apparent that the mechanical structure of Fig. 23A is potentially equivalent to a half $IV_k$ section with the mid-series end towards one receiver, a full mid-shunt $III_4$ section, and another half $IV_k$ section with the mid-series end towards the other receiver.

Figure 32A:
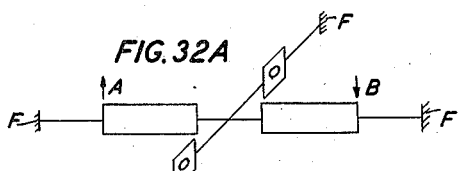
Figure 32B:
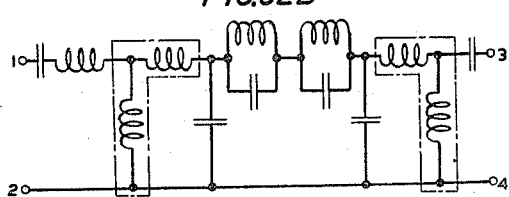
Figure 32C:
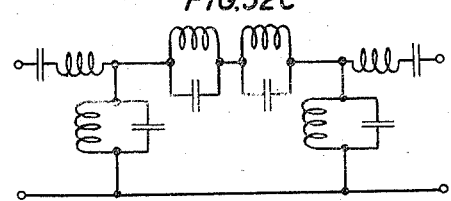
Figure 33A:
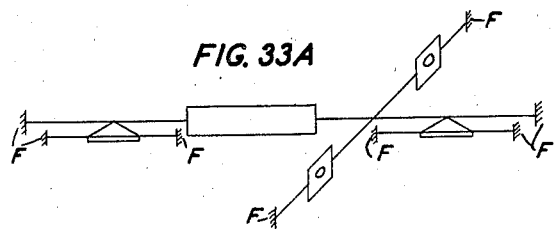
Figure 33B:
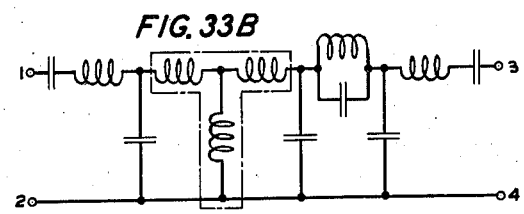
Figure 33C:
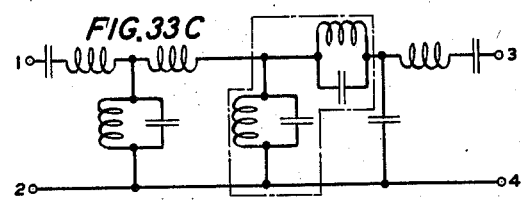
Figure 33D:
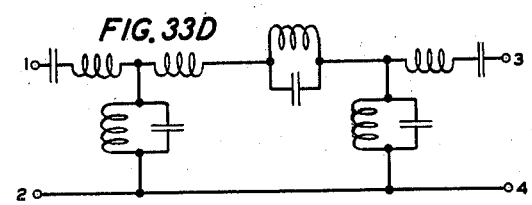

Considering next the mechanical structure of Fig. 32A, it is obvious from the equivalent electrical networks of Figs. 32B and 32C, potentially equivalent to two half $IV_k$ sections with their mid-series ends towards the receivers, and a full mid-shunt VI₂ section. By making the two anti-resonances in the series branch of the VI₂ section equal, the structure is also potentially equivalent to two half IVₖ sections with their mid-series ends towards the receivers, and a full mid-shunt IV₃ or IV₄ section. By the removal of a bar one of the anti-resonant elements in the series branch of the VI₂ section may be reduced to a mere stiffness, so that the structure is then potentially equivalent to two half IVₖ sections with their mid-series ends towards the receivers, and a full mid-shunt V₄ section. Finally, Fig. 33A shows a mechanical structure which is potentially equivalent to two half IVₖ sections with their mid-series ends towards the receivers and a full mid-shunt V₃ section.

All of the foregoing structures containing a mid-shunt type section include a half IVₖ section at each end with its mid-series end towards the receiver. They are, consequently, without further modifications, adapted for direct insertion between receivers, the mass and stiffness of the moving coil system of the receivers being included in the series arms of the half IVₖ sections. Moreover, since the transformation shown in Fig. 67, page 136 of Shea's book, supra, has been used freely on the electrical equivalents of these structures, they include potential internal impedance transformations.

A principal object of the invention is to provide composited mechanical filter structures having high attenuation and precisely controllable impedance, phase and transmission characteristics. However, the effort would be in vain if no consideration were given to the fact that parasitic transmission through the framework supporting the vibratory structures can seriously impair the desired characteristics.

This parasitic transmission is particularly injurious on account of the fact that the reactions of the filter members on the framework may be very large because of the low damping existing in the mechanical members. It would do no good to use extremely heavy and large frames, for the ratio of the forces existing at the points of support, to the mass reactance of the frame would still be appreciable, particularly at those frequencies at which peaks of attenuation of the filter structures occur. Moreover, making the frame very large would admit the possibility of wave motion through the frame. It is necessary, therefore, to seek some more satisfactory solution of the difficulty. Fortunately, there are several methods available which can in general be readily incorporated in any design.

One such method is to design the frame in accordance with the principles and by use of the formulae developed above as a bar having a zero mutual mass between the points on the frame at which the filter structures are supported. As an elementary illustration of this method, consider the frame shown in Figs. 34A and 34B supporting the very simple structure of Fig. 13A. The points C and D are the ones at which reactions will result from vibration of the structure. They correspond to the points $x = -l_1$ and $x = l_2$ in Fig. 1 as far as the frame is concerned.

If the framework could be floated in air, the network of Fig. 13B would have to be modified to that of Fig. 35 to take into account the reactions of the filter on the frame. As illustrated, the mutual mass of the frame $L_b$ acts as a mutual inductive coupling between the input and output half sections of the desired filter. In accordance with the principles of this invention, the framework may be designed by considering it as a bar, one dimension, $t$, being fixed and the other dimensions $p$, $q$ and $s$ being chosen so that the mutual mass $L_b$ is reduced to zero. This will eliminate parasitic transmission through the frame.

Consideration must next be given to the fact that the framework must itself rest on some type of support. Steps must therefore be taken to prevent coupling between the input and output half sections of the desired filter from being re-established through the supporting medium. By resting the frame on some material having high damping, this coupling is in effect established only through a highly dissipative transmission line, as illustrated in Fig. 36 and parasitic transmission may, through such means, be eliminated for all practical purposes.

The same principles of design for mechanical vibratory structures, as described above, are evidently applicable whether we use a single frame with all the bars in tandem or use what may be called a "unit" type of construction where several sections of the total structure occupy separate frames as illustrated in Fig. 37.

With regard to the elimination of parasitic transmission in those structures requiring the use of cross-members which are also fastened to the supporting frame, it will ordinarily be found possible to so choose the structures that the cross-members will carry bars. These bars should then be designed to have zero mutual mass, so that no reaction will be exerted on the frame. An illustration of such an arrangement is shown in Fig. 32A.

Figure 38A:
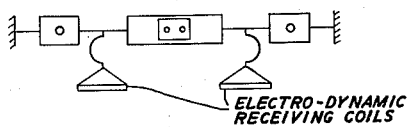
Figure 38B:
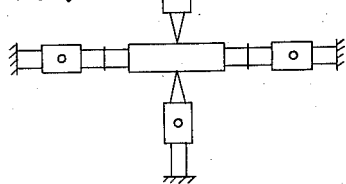
Figure 39A:
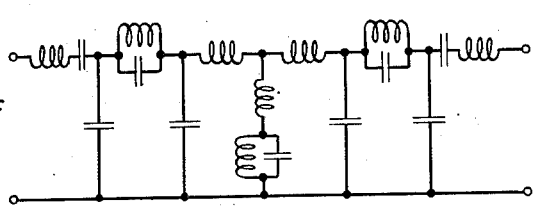
Figure 39B:
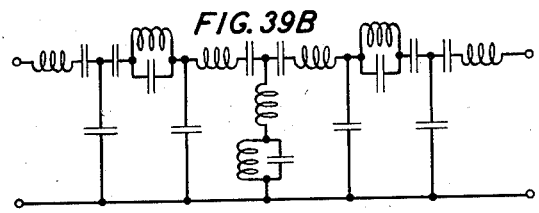
Figure 40:
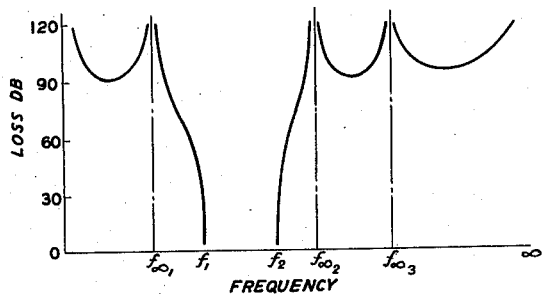

The process may obviously be carried a step further and the structure designed so that all members attaching to the supporting frame carry bars, having no mutual masses, so situated that no energy of the vibratory system may reach the frame. Such a mechanical structure is illustrated in Figs. 38A and 38B. Parallel pair taut wires, as mentioned above, are employed in this structure to facilitate mounting the bars of the vibratory system and to prevent vibration in undesired directions. An equivalent electrical network of the structure of Figs. 38A and 38B is shown in Fig. 39A which may be transformed into the network of Fig. 39B. By suitable design in accordance with the principles above disclosed the structure of Figs. 38A and 38B may be a band filter having a transmission characteristic of the type indicated in Fig. 40.

To more fully illustrate the practical application of the principles of this invention, a detailed description of the design and construction of a somewhat typical filter of the invention will now be given.

The filter to be described hereunder was required to operate between impedances of 160 c. g. s. ohms in order that electromechanical transducers which were readily available might be used. Its lower and upper cut-off frequencies $f_1$ and $f_2$, respectively, were required to be 90 c. p. s. and 110 c. p. s., respectively. In the attenuating regions, the loss desired was determined to require (by the usual method of adding the losses of all sections of a composited filter) four sections, viz., a six-element section having peaks of attenuation at 82.5 c. p. s. and 120 c. p. s., a confluent constant-K section and two three-element sections. A possible arrangement of the equivalent electrical sections of the desired filter is shown in Fig. 41A.

Figure 41A:
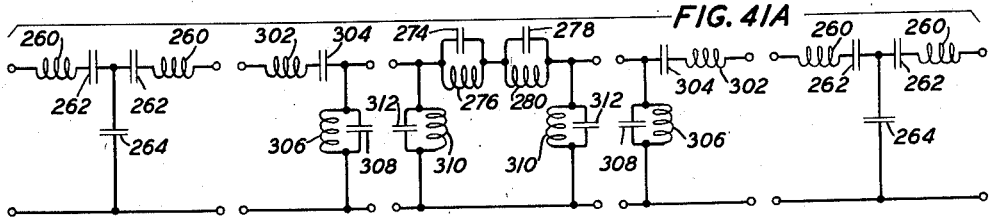

In Fig. 41A the composited filter comprises from left to right a full three-element section of the type shown in Fig. 157(A) at page 283 of Shea, supra, terminated at mid-series on each end, a half of a confluent section of the type shown in Fig. 121(B) at page 230 of Shea, supra, terminated at mid-series on the left end and at mid-shunt on the right end thereof, respectively, a full six-element section of the type shown in Fig. 150(B) at page 276 of Shea, supra, terminated at mid-shunt on each end, a second half of a confluent section (Fig. 121(B), page 230 Shea, supra) with its mid-series arm toward the right and a second full three-element section (Fig. 157A, page 283, Shea supra). At each suggested junction between the sections the impedances are identical. The sections may, therefore, be connected and like elements directly in series or in shunt with each other may be replaced by a single element in accordance with the principles discussed in the above-mentioned paper by Johnson and Shea and illustrated in Figs. 15A and 15B at page 75 of that paper.

Figure 41B:
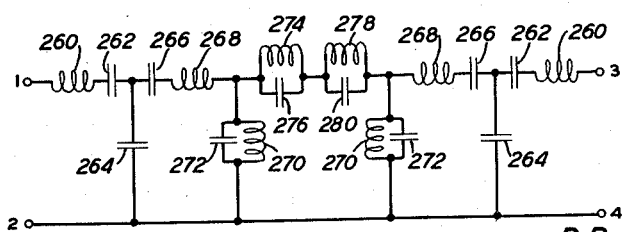

For example, inductances 260 and 302 may be replaced by the single inductance 268 of Fig. 41B which has a value equal to the sum of the values of the inductances it replaces. Capacities 262 and 304 may be replaced by a single capacity 266 whose value is the quotient obtained by dividing the product by the sum of the capacities it replaces. Capacities 308 and 312 may be replaced by a single capacity 272, the value of which is the sum of the capacities it replaces and inductances 306 and 310 may be replaced by a single inductance 270 the value of which is the quotient obtained by dividing the product by the sum of the inductances it replaces.

When all such combinations are effected there results the schematic diagram of Fig. 41B as an equivalent electrical network of the filter desired. Knowing the impedance, the cut-off frequencies, and, for the six-element section, the peak frequencies, element values for each section of Fig. 41A were calculated by use of the formulae given for these sections, respectively, in Shea's book, supra, the necessary combinations were made and the element values for the structure of Fig. 41B were obtained. By the transformation described in connection with Figs. 15B and 15C or Figs. 17B and 17C of this specification, the network of Fig. 41F was then determined to be equivalent to one of the form shown in Fig. 41B. An equivalent mechanical structure for the network of Fig. 41F was then determined to be that shown in Figs. 42A and 42B where inductances 260 and capacities 262 are simulated by the armature masses and diaphragm stiffnesses of the transducers 241 and 243 at each end of the structure, respectively, capacities 264 are simulated by coupling springs 247, capacities 266 by the outer ends of wires 240, inductance T networks, 282, 284 and 286, by bars 250 and 242, capacities 288 by the central portions of wires 240 to the right and left of the junction 0, capacities 292 and 296 by the central portions of wires 244 above and below the junction point 0 and inductances 290 and 294 by the bars 246 and 248, respectively. In Fig. 42A details of transducers 241 and 243 and coupling springs 247 are omitted to avoid unnecessary complexity which it is felt would only produce confusion. These details clearly appear in Fig. 42B.

The transformations involved in going from the network of Fig. 41B to that of 41F may, as explained above, involve impedance transformations. Since both ends of the mechanical structure were to have the same impedance, viz., 160 c. g. s. ohms, the two possible impedance transformations of Fig. 41F had to be mutually compensatory. The portion of the network between the two inductance T networks could, however, have a different impedance from the end portions of the structure.

This possibility was put to good use in this instance since bars 246 and 248 would have been inconveniently small if the impedance of the central section was made only 160 c. g. s. ohms. An inspection of the formulae given by Shea, supra, for this element indicated that an impedance in the neighborhood of 15,000 c. g. s. ohms would result in convenient dimensions for these bars.

The impedance transformation involved is of the type shown in Fig. 178 at page 326 of Shea, supra. The shunt arms of Fig. 41B, composed of inductances 270 and capacities 272, were effectively separated and an "ideal" transformer was effectively inserted, as illustrated in Fig. 41C. (Refer to page 88 of Shea, supra, for a description of an ideal transformer.)

From Fig. 178 at page 326 of Shea, supra, it was apparent that the combination of Fig. 41D, namely, inductance 270 and ideal transformer 316 could be replaced by the T-network of inductances 318, 320 and 322, shown in Fig. 41E. One of the series inductances 318 or 320, however, had to be negative. In the practical structure, therefore, the network had to be assembled so that the negative arm was in series with a larger positive inductance and was effectively incorporated by subtracting its value from that of the positive inductance. Inductances 268 of Fig. 41B were the positive inductances employed to absorb the negative arms in the transformations leading to Fig. 41F.

As is obvious from the formulae given by Shea, supra, the values of the inductances 318, 320 and 322 were determined by the impedance transformation selected. This made possible a further simplification of the mechanical structure for the impedance transformation could be so selected, that when the negative arm 318 had been subtracted from the inductance 268 of Fig. 41B, a positive inductance just equal to inductance 320 remained. The physical significance of this arrangement was that the bars 242 and 250 of the equivalent mechanical structure of Figs. 42A and 42B were then symmetrical and could more readily be constructed.

In view of the several considerations above described, the impedance of the central portion of the filter comprising capacities 288, 292 and 296 and inductances 290 and 294 was selected to be 14,800 c. g. s. ohms and the values of the elements just listed above were calculated as for a filter of that impedance. In so doing, it was necessary to bear in mind that capacities 288 were obtained by adding the capacity of a mid-shunt terminated constant-K confluent section and that of the six-element mid-shunt terminated section itself.

The determination of all the elements involved merely a straight forward use of the formulae of Shea, supra, for the particular sections involved. For the mechanical structure the inductances calculated were in terms of masses in grams and the capacities were stiffnesses in dynes per centimeter. As above indicated, element values for the sections of Fig. 41A were first obtained, from which those of Fig. 41B were then derived. Then the transformations of Figs. 41C, 41D and 41E were performed and the elements of the central section, as listed above, were calculated for the higher impedance. Having done this, the following element values for the structure of Fig. 41F were obtained:

| Masses | | Stiffnesses | |
|---|---|---|---|
| Designation No. | Value in grams | Designation No. | Value in dynes per cm. |
| 260 | 1.27 | 262 | .418×10⁶ |
| 282 | 2.30 | 264 | 1.005×10⁵ |
| 284 | .267 | 266 | .916×10⁶ |
| 286 | 2.30 | 288 | 1.007×10⁶ |
| 290 | 11.55 | 292 | 6.56 ×10⁶ |
| 294 | 16.80 | 296 | 4.51 ×10⁶ |

The bars were made of cold rolled steel. Possible contours and dimensions were calculated by use of the general bar formulae given above to be as shown in Figs. 42C, 42D and 42E, respectively. In the actual design of bars 242 and 250 it was found that more convenient physical dimensions could be obtained by designing the body of the bar to have somewhat more than the desired mutual mass and then designing the "horns" to contribute negative mutual mass to obtain the net value of mutual mass desired. If this had not been done, the bars would have been inconveniently small.

Bars 246 and 248 were designed to have no mutual mass so that no energy would reach the frame support 252 through wires 244.

The frame support 252 was designed as a bar having no mutual mass between points C and D to which wires 240 attach. Supports K holding frame support 252 and supports 251 for transducers 241 and 243 were designed to offer high attenuation to the transfer of vibratory energy so that parasitic transmission of energy between the input and output of the filter was rendered negligible.

The physical design of the elastance elements 266, 288, 292 and 296 contributed by the taut wires was obtained in the following manner.

The low frequency stiffness contributed by a length of a wire of area S tensed with a stress of $t$ dynes per square centimeter is $tS/l$.

Choosing 1″ as a convenient length for the stiffness $.916 \times 10^6$ of elastance 266, by inverse proportion, the stiffness $1.007 \times 10^6$ of elastance 288 was found to require a length of .910″. The length of bars 242 and 250 between supporting points on wires 240 having been determined to be .600″, the total length of wires 240 between points C and D was determined to be $$2(1.000'' + .600'' + .910'')$$

or 5.02″. The tension required was calculated from the equation $$K = \frac{2tS}{l} \quad (91)$$

for the pair, each having area S. For an $l$ of 1″ or 2.54 cms., and a K of $.916 \times 10^6$ we obtained $tS = 1.162 \times 10^6$ dynes. Assuming a diameter of 5 mils, S is $$\frac{\pi}{4}[.005(2.54)]^2$$

square cms. and $t$ is $.915 \times 10^{10}$ dynes per square centimeter which is safely within the elastic limit of the steel piano wire contemplated for use in the filter.

The density of this wire $d$ is 7.83 grams per cubic centimeter. The natural frequency to which the wire must be tuned to obtain the desired tension is given by the expression, $$f_r = \frac{1}{2l}\sqrt{\frac{t}{d}} = \frac{1}{2(5.02)(2.54)}\sqrt{\frac{(.915)10^{10}}{7.83}} = 1290 \text{ c. p. s.} \quad (92)$$

The wires 244 may be designed in a like manner. Since the bars 246 and 248 have no mutual masses, the outer ends of wires 244 are, of course, effectively isolated from the vibratory system and it is only the central portions of these wires 244 above and below the junction O which need be precisely designed and adjusted.

For convenience in assembly, the bars were divided horizontally so that they could be clamped by screws at each end to the taut wires. Grooves were provided in the bars into which the wires fitted tightly when the clamping screws were tightened so that the wires in the grooves became effectively part of the bar.

The coupling springs 247 were designed in accordance with the methods employed for similar springs employed in the well-known types of mechanical filters of the prior art.

The structures and embodiments above described are merely illustrative of the principles of the invention and by no means exhaust the possible applications thereof. The scope of the invention is defined in the appended claims.

What is claimed is:

1. In a mechanical vibratory system, a rigid bar, means for elastically supporting said bar at two points along its longitudinal axis both said supporting means permitting said bar to vibrate laterally, means for imparting lateral oscillatory energy to said bar at one of said points of support, and means for utilizing the resulting lateral oscillatory energy of said bar at the other of said points of support.

2. In a mechanical vibratory system, a bar having a mass distribution such that a pair of points which are mutually centers of percussion with respect to each other for motion in a particular mutual plane exist on said bar, means for supporting said bar severally at said pair of points, said means being elastic with respect to motion in said particular mutual plane so that when oscillatory motion in said plane is imparted to said bar at either of said points no oscillatory motion in said plane will occur at the other of said points whereby the bar is made to contribute effectively to said mechanical vibratory system an independent point mass at each point of support.

3. In a mechanical vibratory system, a supporting frame, a tensed wire held by said frame, and two bars, one of said bars being clamped on said wire near each end thereof in such manner that each of said bars will be attached to said wire effectively at two points of the bar, the said two points in the case of each of said bars being mutually conjugate with respect to motion perpendicular to said wire whereby vibration perpendicular to said wire will not be transmitted from the central portion of said wire to said frame nor from said frame to the central portion of said wire.

4. In a mechanical vibratory system, a supporting frame, a plurality of tensed wires held by said frame, a plurality of bars clamped on each of said wires, the bars nearest the said supporting frame in each instance being attached to their respective wires effectively at two points, the two points in the case of each of said nearest bars being mutually conjugate with respect to motion perpendicular to the said wires whereby vibrations perpendicular to the said wires will not be transmitted from the central portions thereof to said frame nor from said frame to the central portions of the said wires.

5. An electromechanical wave filter comprising supporting means, an elastance disposed for lateral vibration between two points in said supporting means, a rigid distributed mass element firmly attached to said elastance at two points intermediate the points of attachment of said elastance to said supporting means, and means for driving said mass element laterally with respect to said elastance, characterized in this that said element has different velocities at different points, whereby said element provides effectively lumped series and shunt component masses which may be given independently assignable values.

6. A wave filter in accordance with claim 5 in which said mass element is supported at conjugate points whereby the transmission of energy through said mass element to said supporting means is prevented.

7. A wave filter in accordance with claim 5 in which said two points in said supporting means are conjugate with respect to each other whereby the parasitic transmission of energy through said supporting means is prevented.

8. A mechanical vibratory system comprising a plurality of bars, a plurality of elastance members and a supporting frame, said bars being interconnected and connected to said frame by said elastance members, means for imparting vibratory energy to said system at one point of said system and means for absorbing vibratory energy from another point of said system, the transfer of energy through said system being longitudinal with respect to the bars and elastance members, and substantially in quadrature with the vibratory motion of said bars and said elastance members.

9. The system of claim 8, the bars and elastance members of the system being proportioned, distributed and interconnected so that vibratory energy of frequencies within a predetermined band of frequencies will be freely transmitted through said system, energy of other frequencies being substantially prevented from passing through the system.

10. In a mechanical vibratory system, a rigid bar having a particular mass distribution with respect to its longitudinal axis, a pair of resilient supports for said bar, said supports permitting lateral vibratory motion of said bar, said supports being respectively attached to two points on said bar so located along the longitudinal axis of said bar that a mechanical impedance transformation is introduced by the longitudinal transmission of energy through said bar resulting from the introduction of lateral vibratory motion at one of said points of support and the withdrawal of like vibratory motion at the other of said points of support.

11. In a mechanical vibratory system, a rigid bar means for elastically supporting said bar at a plurality of points, said means permitting lateral vibration of all points of said bar, the elastances of the supporting means and the mass distribution of the bar being proportioned with respect to each other so as to transmit lateral vibratory energy to a point near one end of the longitudinal axis of said bar when lateral vibratory energy having a frequency within a particular range of frequencies is imparted to it at a point near the other end of its longitudinal axis.

12. The combination of claim 11 and an additional mechanical impedance coupled to the midpoint between said points of application and absorption of energy whereby the mechanical coupling between said latter two points is modified without changing the mechanical point impedance at said latter two points.

13. In a mechanical vibratory system, a bar elastically supported for lateral vibratory motion and containing two points on its longitudinal axis such that lateral vibratory energy imparted to one of said points will not in the absence of additional structure be transmitted to the other of said points, and a mechanical impedance to lateral vibratory motion coupled to said bar at a point other than said two conjugate points whereby a desired mechanical coupling between said conjugate points is established.

14. A mechanical vibratory system, a rigid frame support therefor, said system being supported at two points on said frame support, the mass distribution of said frame support being adjusted so that no transfer of the vibratory energy of the system may occur between said two points on said frame support and a support for said frame support, said second-stated support being of material highly dissipative with respect to the transfer of vibratory energy of the system therethrough whereby the transfer of said energy through said frame support and the said second-stated support is substantially eliminated.

15. A mechanical wave filter, a component element of one of the impedance branches of said filter consisting of a mass contributed by a laterally vibrating rigid bar, said bar being resiliently supported for lateral motion at two points, said points being located near the opposite ends respectively of said bar.

16. A transformer of mechanical vibratory energy comprising a rigid bar supported at two points, said supports permitting free lateral vibratory motion of said bar, the mass distribution of said bar being such that lateral vibratory motion imparted to a point at one end of said bar will be transmitted to a point at the other end of said bar, the mechanical impedance level at the said second point being different from that at the first point.

17. A transformer of mechanical vibratory energy comprising the device of claim 16 with an additional mechanical impedance to lateral vibratory motion attached to a third point on said bar whereby the transfer of lateral vibratory energy from one end of said bar to the other is modified.

18. A transformer of mechanical vibratory energy comprising a bar resiliently supported at conjugate points and an additional mechanical impedance to lateral vibratory motion attached to a third point on said bar whereby the mutual impedance coupling the said conjugate points is determined solely by said additional mechanical impedance.

19. In a mechanical vibratory system a rigid element having a predetermined mass distribution along a particular axis of said element, said element being elastically supported to permit mechanical vibration of all parts of said element in quadrature to said axis, means for imparting mechanical vibratory energy to said element at a first point near one end of said axis in quadrature relation thereto and means for absorbing like energy from said element at a second point near the opposite end of said axis whereby said element may contribute to the mechanical vibratory system effectively a first point mass at said first point, a second point mass at said second point and a mutual mass, the magnitudes of all three of said masses respectively being determined by the said mass distribution.

20. In a mechanical vibratory system the combination of claim 19, the mass distribution along said axis being such that the magnitude of the said mutual mass is zero whereby said element provides, in effect, independent point masses at said first and said second points respectively for use in said system.

21. In a mechanical vibratory structure a rigid bar, a pair of supports for said bar, resiliently supporting said bar at two points thereon for lateral vibratory motion, means for imparting lateral vibratory energy to said bar at one of said points of support and means for extracting like energy at the second of said points, the mass distribution of said bar and the resilience of said supports being proportioned to facilitate the transmission of vibratory energy within a particular range of frequencies and to prevent the transmission of energy of other frequencies.

22. A mechanical wave filter including supporting means, a pair of rigid bars and a plurality of elastance elements, a first elastance element coupling adjacent ends of said bars together, a second and a third elastance element coupling the opposite ends of said two bars respectively to said frame support in such manner as to suspend said bars in a common plane with said elastance elements, means for imparting lateral vibratory energy to an end of one bar and means for utilizing the resulting lateral vibratory energy transmitted to an end of the other bar.

23. A mechanical wave filter as defined in claim 22 and a fourth elastance element suspended between two points of said supporting means in the common plane of said bars but transversely to the longitudinal axes thereof said fourth elastance element connecting to said first elastance element at the mid-point of said first elastance element.

24. A mechanical wave filter as defined in claim 22 and a fourth and a fifth elastance elements, said elastance elements each being suspended between two points of said supporting means in the common plane of said bars but transversely to the longitudinal axes thereof, said fourth elastance element connecting to said first elastance element at the mid-point of said first elastance element, said fifth elastance element connecting to one of said bars at a point between the ends thereof.

25. A mechanical wave filter as defined in claim 22 one of said bars having zero mutual mass coupling the points near its ends at which it is attached to elastance elements.

26. A mechanical wave filter including supporting means, a plurality of elastance elements, a rigid bar suspended from said supporting means between two elastance elements the said two elements connecting to points near each of the ends of the bar respectively, a third elastance element, arranged in the same plane as said bar but transversely to the longitudinal axis thereof said third elastance element connecting to a point near the center of said bar, second and third rigid bars suspended between the respective ends of said third elastance element and a fourth and a fifth elastance element respectively said fourth and fifth elastance elements connecting to said supporting means, said second and third rigid bars having zero mutual mass coupling their respective points of attachment to elastance elements.

27. The mechanical wave filter of claim 26 said supporting means being a rigid frame proportioned to have zero mutual mass coupling the points thereon to which the first stated two elastance elements are connted.

RALPH B. BLACKMAN.
EMORY LAKATOS.